(12) United States Patent
Fujimaki et al.

(10) Patent No.: US 10,101,586 B2
(45) Date of Patent: Oct. 16, 2018

(54) DISPLAY DEVICE AND CONTROL METHOD FOR DISPLAY DEVICE

(71) Applicant: SEIKO EPSON CORPORATION, Tokyo (JP)

(72) Inventors: Yutaka Fujimaki, Matsumoto (JP); Masayuki Takagi, Matsumoto (JP); Fusashi Kimura, Matsumoto (JP); Kenro Yajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 342 days.

(21) Appl. No.: 14/957,119

(22) Filed: Dec. 2, 2015

(65) Prior Publication Data

US 2016/0187652 A1 Jun. 30, 2016

(30) Foreign Application Priority Data

Dec. 24, 2014 (JP) ................................. 2014-260216
Jun. 12, 2015 (JP) ................................. 2015-119199

(51) Int. Cl.
*G02B 27/01* (2006.01)

(52) U.S. Cl.
CPC ....... *G02B 27/0172* (2013.01); *G02B 27/017* (2013.01); *G02B 2027/014* (2013.01); *G02B 2027/0112* (2013.01); *G02B 2027/0118* (2013.01); *G02B 2027/0132* (2013.01); *G02B 2027/0178* (2013.01)

(58) Field of Classification Search
None
See application file for complete search history.

(56) References Cited

U.S. PATENT DOCUMENTS

| 6,900,778 B1* | 5/2005 | Yamamoto | G02B 27/0093 345/8 |
| 8,970,571 B1* | 3/2015 | Wong | G02B 27/0101 345/207 |
| 9,064,445 B2* | 6/2015 | Kobayashi | G09G 5/10 |
| 9,625,722 B2* | 4/2017 | Rekimoto | G02B 27/0172 |
| 2005/0207046 A1* | 9/2005 | Tamura | G02B 26/008 359/891 |
| 2006/0126170 A1* | 6/2006 | Yamashita | G01N 21/6458 359/398 |
| 2007/0229452 A1* | 10/2007 | Sano | G09G 3/3406 345/102 |
| 2007/0242718 A1* | 10/2007 | Kawakami | G02B 6/0068 372/50.12 |
| 2008/0218460 A1* | 9/2008 | Oh | G09G 3/3406 345/87 |

(Continued)

FOREIGN PATENT DOCUMENTS

| JP | H06-308891 A | 11/1994 |
| JP | 2006-012042 A | 1/2006 |

(Continued)

*Primary Examiner* — Kumar Patel
*Assistant Examiner* — Amy C Onyekaba
(74) *Attorney, Agent, or Firm* — Oliff PLC

(57) ABSTRACT

An HMD includes an image display section worn on the head of a user and configured to output image light and an illuminance sensor configured to detect light. The HMD includes a sub-control section. The sub-control section adjusts, on the basis of a detection value of the illuminance sensor, the image light output by the image display section.

28 Claims, 15 Drawing Sheets

(56) References Cited

U.S. PATENT DOCUMENTS

| | | | | |
|---|---|---|---|---|
| 2008/0252572 A1* | 10/2008 | Kang | .................... | G09G 3/3225 345/77 |
| 2010/0182346 A1* | 7/2010 | Sano | .................... | G09G 3/3413 345/690 |
| 2011/0050663 A1* | 3/2011 | Katahira | .................... | G09G 5/02 345/207 |
| 2011/0134152 A1* | 6/2011 | Furihata | .................... | G09G 3/3648 345/690 |
| 2012/0050505 A1* | 3/2012 | Yabui | .................... | G02B 27/2235 348/54 |
| 2012/0320100 A1* | 12/2012 | Machida | .................... | G02B 27/017 345/690 |
| 2013/0077284 A1* | 3/2013 | Chang | .................... | G02B 5/30 362/19 |
| 2013/0113973 A1* | 5/2013 | Miao | .................... | G09G 3/003 348/333.01 |
| 2014/0063045 A1* | 3/2014 | Chang | .................... | G09G 5/10 345/592 |
| 2014/0063853 A1* | 3/2014 | Nichol | .................... | G02B 6/0028 362/616 |
| 2014/0104439 A1* | 4/2014 | Tatsumi | .................... | H04N 17/00 348/189 |
| 2014/0152711 A1* | 6/2014 | Sekiya | .................... | G02B 27/01 345/690 |
| 2014/0192092 A1* | 7/2014 | Aruga | .................... | G02B 27/017 345/690 |
| 2015/0213781 A1* | 7/2015 | Huang | .................... | G09G 5/10 345/207 |
| 2015/0279260 A1* | 10/2015 | Katagiri | .................... | B60K 35/00 345/690 |
| 2016/0026253 A1* | 1/2016 | Bradski | .................... | G02B 27/225 345/8 |
| 2016/0027408 A1* | 1/2016 | Liu | .................... | G09G 5/00 345/690 |
| 2016/0266347 A1* | 9/2016 | Shimoda | .................... | G02B 7/32 |

FOREIGN PATENT DOCUMENTS

| | | |
|---|---|---|
| JP | 2006-139124 A | 6/2006 |
| JP | 2013-174708 A | 9/2013 |
| WO | 2013/125318 A1 | 8/2013 |

* cited by examiner

DISPLAY DEVICE AND CONTROL METHOD FOR DISPLAY DEVICE

BACKGROUND

1. Technical Field

The present invention relates to a display device and a control method for the display device.

2. Related Art

There has been known a display device mounted on the head of a user (see, for example, JP-A-2006-12042 (Patent Literature 1)). In a display device that emits light, in general, the intensity of the light emitted by the display device, in other words, the luminance or the brightness of display can be adjusted. The same applies to the display device mounted on the head.

There has been known a display device that secures the visibility of a displayed image and a displayed video when the display image and the displayed video are affected by light in the outside world (also referred to as external light) (see, for example, JP-A-2006-139124 (Patent Literature 2)). A head mounted display (HMD) disclosed in Patent Literature 2 irradiates light to the outside world in order to display a video and secure a preferred visual field even in a dark place. The display device differentiates a color directly recognized by a user from the external light and a color recognized from video light irradiated by the display device to make it easy to distinguish the displayed video from the outside world.

When the eyes of a user and a display device are close to each other as in the display device described in Patent Literature 1, it is requested to set the luminance of display according to preference of the user. The feeling of brightness of display of the display device is affected by not only the sense of the user but also other factors such as the external light made incident on the eyes of the user. For example, it is likely that the feeling of the luminance of the display of the display device is substantially different when the light emitted from the display device and the external light are made incident on the eyes of the user from the same direction and when the external light is not made incident on the eyes. Therefore, control concerning the luminance of the display of the display device tends to be complicated, a processing load increases, and it is difficult to adjust the luminance as desired by the user.

When the device outputs the light to display a video and an image as described in Patent Literature 2, the appearance of the light output by the device changes according to the influence of other light. Patent Literature 1 discloses an example in which the wavelength of image light is set to a wavelength different from the wavelength of light irradiated to the outside world by the device. However, in this example, the wavelength of the irradiated light is known. On the other hand, when the wavelength of light affecting the visibility of an image displayed by the display device cannot be specified in advance, measures cannot be taken.

SUMMARY

An advantage of some aspects of the invention is to appropriately adjust, according to external light or the like, the visibility of an image displayed by a display device.

Another advantage of some aspects of the invention is to appropriately adjust the luminance of display through simple processing in a display device mounted on the head of a user.

Still another advantage of some aspects of the invention is to, when the visibility of an image displayed by a device by outputting image light is affected by light other than image light, appropriately take measures to enable adjustment of the visibility of the image.

A display device according to an aspect of the invention includes: a display section configured to output image light to a user; a light detecting section configured to detect light; and a control section configured to adjust, on the basis of a detection value of the light detecting section, the image light output by the display section.

According to the aspect, it is possible to adjust the image light according to the light detected by the light detecting section and adjust the visibility of the image light and adjust the visibility of light other than the image light.

A display device of a head mounted type mounted on the head of a user according to another aspect of the invention includes: a display section configured to irradiate image light on the eyes of the user; a light detecting section configured to detect light; and a control section configured to perform adjustment processing for adjusting the luminance of display of the display section and correction processing for calculating a correction coefficient on the basis of a detection value of the light detecting section and correcting the luminance of the display of the display section.

According to the aspect, it is possible to easily execute the processing for adjusting the luminance of the display and the processing for changing the luminance of the display on the basis of the detection value of the light detecting section. Therefore, it is possible to appropriately adjust the luminance of the display through processing with a light load.

In the display device according to the aspect, the control section may calculate the correction coefficient using the detection value of the light detecting section and correct, in the correction processing, the luminance of the display of the display section after the adjustment processing according to the calculated correction coefficient.

According to the aspect with this configuration, it is possible to easily execute, after adjusting the luminance of the display, the processing for changing the adjusted luminance according to the detection value of the light detecting section.

In the display device according to the aspect, the control section may calculate the correction coefficient by applying the detection value of the light detecting section to an arithmetic expression set in advance and performing arithmetic processing.

According to the aspect with this configuration, it is possible to easily calculate the correction coefficient corresponding to the detection value through the arithmetic processing.

In the display device according to the aspect, the control section may calculate the correction coefficient by applying the detection value of the light detecting section to a table set in advance.

According to the aspect with this configuration, it is possible to reduce a load of the processing for calculating the correction coefficient corresponding to the detection value.

In the display device according to the aspect, the control section may perform, in the correction processing, according to the correction coefficient, an arithmetic operation for correcting the luminance of the display after the adjustment processing and correct the luminance of the display.

According to the aspect with this configuration, it is possible to quickly change the luminance of the display reflecting the correction coefficient.

In the display device according to the aspect, the control section may multiply a luminance value of the display of the display section set in the adjustment processing by the correction coefficient and correct the luminance value of the display of the display section through the correction processing.

According to the aspect with this configuration, it is possible to reflect the detection value of the light detecting section on the adjusted luminance of the display and appropriately adjust the luminance of the display through processing with a light load by using the coefficient.

In the display device according to the aspect, the control section may execute hysteresis processing in changing a luminance value of the display of the display section to the corrected luminance value through the correction processing and may be capable of setting a condition of the hysteresis processing independently when the luminance value of the display of the display section is changed to a high luminance side and when the luminance value is changed to a low luminance side.

According to the aspect with this configuration, it is possible to set hysteresis concerning a change in the luminance of the display section. Therefore, when the detection value of the light detecting section changes, it is possible to satisfactorily maintain the visibility for the user. The hysteresis can be set independently when the luminance value of the display is increased and when the luminance value of the display is reduced. Therefore, it is possible to set the hysteresis according to characteristics of the eyes of the user or according to preference of the user and an environment of use of the display device.

In the display device according to the aspect, the display section may include a display section for right eye configured to irradiate the image light on the right eye of the user and a display section for left eye configured to irradiate the image light on the left eye of the user, and the control section may set the luminance of the display section for right eye and the luminance of the display section for left eye independently from each other through the adjustment processing.

According to the aspect with this configuration, it is possible to adjust the luminance of the display according to each of the left and right eyes. Then, it is possible to reflect the detection value of the light detecting section on the adjusted luminance of the display and appropriately adjust the luminance of the display.

In the display device according to the aspect, the display section may be a display section of a see-through type that transmits external light and makes the external light incident on the eyes of the user.

According to the aspect with this configuration, it is possible to appropriately adjust the luminance of the display according to a light amount of the external light that greatly affects the luminance of the display.

In the display device according to the aspect, the light detecting section may include a light sensor that detects light from a direction of visual recognition of the user through the display section.

According to the aspect with this configuration, it is possible to appropriately adjust the luminance of the display according to a light amount of the external light that greatly affects the luminance of the display.

In the display device according to the aspect, the display device may further include a second control section configured separately from the control section and connected to the control section, the second control section may instruct the control section to perform the correction processing, and the control section may execute the adjustment processing and the correction processing on the basis of the instruction of the second control section.

According to the aspect with this configuration, it is possible to suppress a load of the second control section that gives an instruction to the control section and appropriately adjust the luminance of the display.

A display device according to still another aspect of the invention includes: a display section configured to output image light including a plurality of color lights to a user and display a display object; a light detecting section configured to detect light; and a control section configured to control, on the basis of a detection result of the light detecting section, a color tone of the image light output by the display section.

According to the aspect, it is possible to change the color tone of the image light according to the light detected by the light detecting section. Therefore, for example, when the light detecting section detects light made incident on a visual field of the user other than the image light, it is possible to control a color tone of the light and the color tone of the image light to match and control the color tones to improve the visibility of the image light. Consequently, it is possible to appropriately adjust the visibility of an image displayed by the display device.

In the display device according to the aspect, the light detecting section may detect light from a direction different from a direction of the image light output by the display section.

According to the aspect with this configuration, it is possible to control the color tones of the image light and the light made incident on the visual field of the user other than the image light to match and control the color tones to improve the visibility of the image light. It is possible to appropriately adjust the visibility of the image displayed by the display device.

In the display device according to the aspect, the display section may be worn on the head of the user and configured to output the image light in a state in which external light can be made incident on the visual field of the user, and the light detecting section may detect the external light made incident on the visual field of the user.

According to the aspect with this configuration, by changing, according to the external light made incident on the visual field of the user, a color tone of an image displayed by the display device mounted on the head of the user, it is possible to adjust the visibility of the image.

A display device according to yet another aspect of the invention includes: a display section configured to output image light including a plurality of color lights to a user and display an image; a light detecting section provided adjacent to the display section and configured to detect light from the front of the face of the user; and a control section configured to control, on the basis of a detection result of the light detecting section, a color tone of the image light output by the display section.

According to the aspect, it is possible to change a color tone of the image light according to the light detected by the light detecting section provided adjacent to the display section. Therefore, it is possible to control a color tone of the light detected in the vicinity of the display section by the light detecting section and the color tone of the image light to match and control the color tones to improve the visibility of the image light. Consequently, it is possible to appropriately adjust the visibility of an image displayed by the display device.

In the display device according to the aspect, the control section may cause, on the basis of image data including a plurality of color data, the display section to output the color lights forming the image and, by changing a gradation value of the color data included in the image data, change the color tone of the image light.

According to the aspect with this configuration, it is possible to adjust the visibility of the image through data processing by changing a gradation value of each color included in the image data.

In the display device according to the aspect, the light detecting section may include a sensor that detects the intensity of received light for each of a plurality of different wavelengths.

According to the aspect with this configuration, it is possible to obtain information concerning a color of light made incident on the visual field of the user.

In the display device according to the aspect, the control section may control, on the basis of the intensity of the light for each wavelength detected by the light detecting section, the color tone of the image light output by the display section.

According to the aspect with this configuration, by controlling the color tone of the image light according to the color of the light made incident on the visual field of the user, it is possible to adjust the visibility of the image displayed by the display device.

In the display device according to the aspect, the control section may control the color tone of the image light to improve the visibility of the user for visually recognizing the image light.

According to the aspect with this configuration, it is possible to improve, according to the color of the light made incident on the visual field of the user, the visibility of the image displayed by the display device.

In the display device according to the aspect, the control section may control the luminances of the respective color lights included in the image light to bring the color tone of the image light close to a color tone of the light detected by the light detecting section.

According to the aspect with this configuration, it is possible to adapt the color tone of the image light to the color of the light made incident on the visual field of the user and match the image displayed by the display device to a color of external light or the like.

In the display device according to the aspect, the control section may be configured to be capable of executing first processing for controlling, on the basis of the intensity of the light for each wavelength detected by the light detecting section, the luminances of the respective color lights included in the image light to improve the visibility of the user for visually recognizing the image light and second processing for controlling, on the basis of the intensity of the light for each wavelength detected by the light detecting section, the luminances of the respective color lights included in the image light to bring the color tone of the image light close to a color tone of the light detected by the light detecting section and select and execute one of the first processing and the second processing according to an attribute of an image displayed on the display section.

According to the aspect with this configuration, it is possible to select and execute, according to an attribute of the image displayed by the display device, processing for improving the visibility of the image with respect to the external light or the like and processing for matching the image to the external light or the like.

In the display device according to the aspect, when executing the first processing, if the intensity of the light detected by the light detecting section is lower than intensity set in advance, the control section may change a ratio of the luminances of the respective color lights included in the image light to a ratio set in advance.

According to the aspect with this configuration, it is possible to appropriately adjust the visibility of an image even if the intensity of light such as the external light is low.

In the display device according to the aspect, if the intensity of the light detected by the light detecting section is lower than intensity set in advance, the control section may change a ratio of the luminances of the respective color lights included in the image light to a ratio set in advance.

According to the aspect with this configuration, it is possible to appropriately adjust the visibility of an image even if the intensity of light such as the external light is low.

In the display device according to the aspect, the light detecting section may be capable of being switched to a first detection state and a second detection state more suitable for detection of light having low intensity than the first detection state, and, when the light detecting section is switched to the second detection state, the control section may change the ratio of the luminances of the respective color lights included in the image light to the ratio set in advance.

According to the aspect with this configuration, by switching a detection state of the light detecting section according to the intensity of detected light, it is possible to detect light highly accurately and in a wide range.

In the display device according to the aspect, if the intensity of the light detected by the light detecting section is lower than the intensity set in advance, the control section may execute contrast correction processing and/or edge correction processing on image data of the image displayed by the display section.

According to the aspect with this configuration, if the intensity of the light such as the external light is low, by performing the contrast correction processing and/or the edge correction processing, it is possible to effectively improve the visibility of an image.

In the display device according to the aspect, the display section may include a display region located in the visual field of the user, and the control section may divide the display region into a plurality of portions and control the color tone of the image light for each of the portions on the basis of a detection result of detection of the external light made incident on the visual field of the user by the light detecting section.

According to the aspect with this configuration, it is possible to adjust the visibility of an image for each of the portions of the display region.

In the display device according to the aspect, the light detecting section may be capable of detecting the intensities of respective lights made incident on the visual field of the user from a plurality of directions.

According to the aspect with this configuration, it is possible to adjust the visibility of an image according to the respective lights made incident on the visual field of the user from the plurality of directions.

In a control method for a display device according to still yet another aspect of the invention including a display section configured to output image light to a user and a light detecting section configured to detect light, the control method includes adjusting, on the basis of a detection value of the light detecting section, the image light output by the display section.

According to the aspect, by adjusting the image light according to the detected light, it is possible to adjust the visibility of the image light and the visibility of light other than the image light.

A control method for a display device according to further another aspect of the invention includes: controlling the display device including a display section worn on the head of a user and configured to irradiate image light on the eyes of the user and a light detecting section configured to detect light; and executing adjustment processing for adjusting the luminance of display of the display section and correction processing for calculating a correction coefficient on the basis of a detection value of the light detecting section and correcting the luminance of the display of the display section.

According to the aspect, it is possible to easily execute the processing for adjusting the luminance of the display and the processing for changing the luminance of the display on the basis of the detection value of the light detecting section. Therefore, it is possible to appropriately adjust the luminance of the display through processing with a light load.

In a control method for a display device according to still further another aspect of the invention including a display section configured to output image light including a plurality of color lights to a user and display an image and a light detecting section configured to detect light made incident on the visual field of the user from a direction different from a direction of the image light output by the display section, the control method includes controlling, on the basis of a detection result of the light detecting section, a color tone of the image light output by the display section.

According to the aspect, it is possible to change the color tone of the image light according to light made incident on the visual field of the user other than the image light. Therefore, it is possible to control the color tones of the image light and the light made incident on the visual field of the user other than the image light to match and control the color tones to improve the visibility of the image light. Consequently, it is possible to appropriately adjust the visibility of the image displayed by the display device.

When the display device is controlled by a computer to execute the control method, the invention can also be configured as a computer-readable program or a recording medium having recorded therein the program to be readable by the computer. As the recording medium, it is possible to use various computer-readable media such as a flexible disk, a HDD (Hard Disk Drive), a CD-ROM (Compact Disk Read Only Memory), a DVD (Digital Versatile Disk), a Blu-ray (registered trademark) Disc, a magneto-optical disk, a non-volatile memory card, an internal storage device (a semiconductor memory such as a RAM (Random Access Memory) or a ROM (Read Only Memory)) of an image display apparatus, and an external storage device (a USB (Universal Serial Bus) memory, etc.).

BRIEF DESCRIPTION OF THE DRAWINGS

The invention will be described with reference to the accompanying drawings, wherein like numbers reference like elements.

FIGS. 4A and 4B are flowcharts for explaining the operation of the head-mounted display device, wherein FIG. 4A shows the operation of a control device and FIG. 4B shows the operation of the image display section.

FIGS. 8A to 8C are diagrams showing display states of the head-mounted display device, wherein FIG. 8A is an explanatory diagram showing the position of a display region, FIG. 8B shows a first display example, and FIG. 8C shows a display example.

FIGS. 9A and 9B are flowcharts for explaining the operation of the head-mounted display device, wherein FIG. 9A shows the operation of a control device and FIG. 9B shows the operation of an image display section.

FIGS. 13A and 13B are explanatory diagrams of the operation of a head-mounted display device in a fourth embodiment, wherein FIG. 13A shows a region provided in a picked-up image to correspond to a display region and FIG. 13B shows the display region.

DESCRIPTION OF EXEMPLARY EMBODIMENTS

First Embodiment

Figure 1:
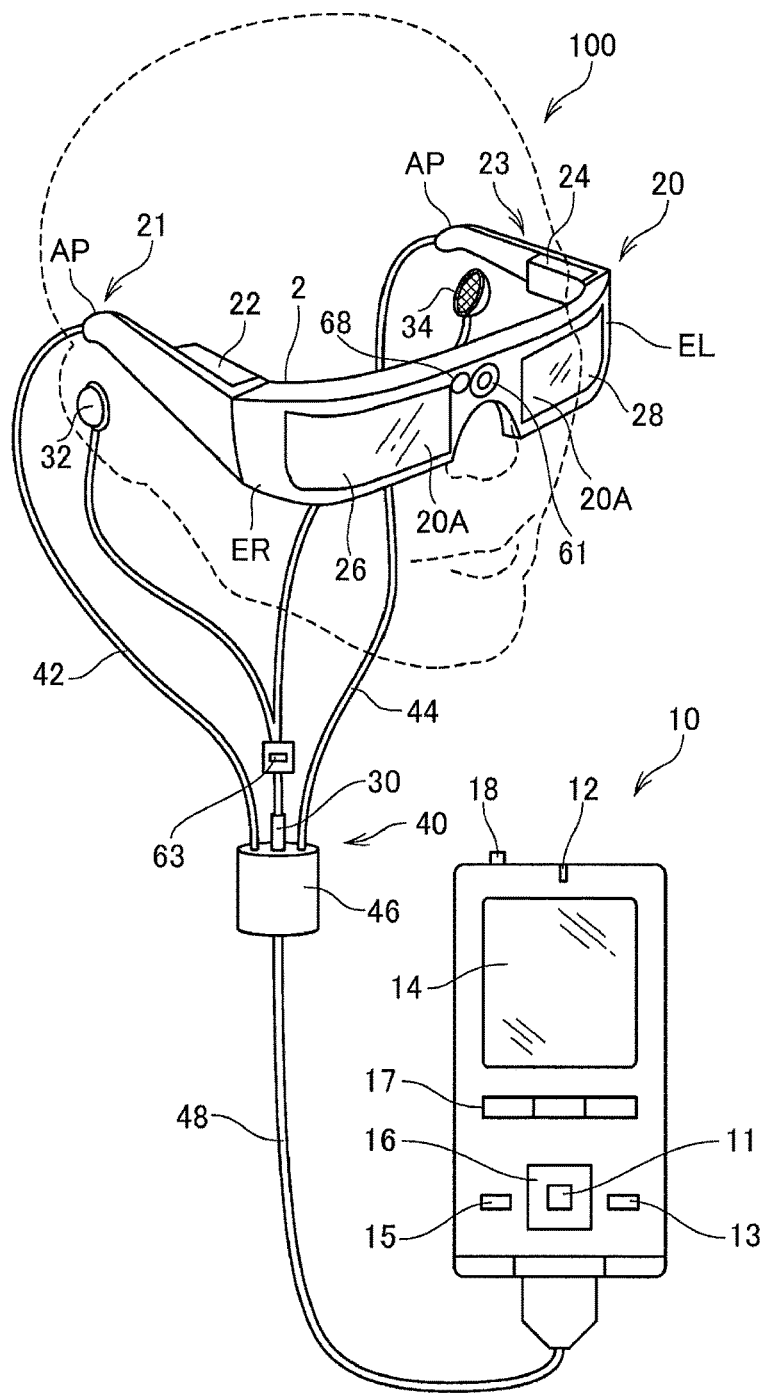
FIG. 1 is an explanatory diagram showing the exterior configuration of a head-mounted display device in a first embodiment.

FIG. 1 is an explanatory diagram showing the exterior configuration of an HMD (Head Mounted Display: a head-mounted display device) 100 according to a first embodiment applied with the invention.

The HMD 100 (a display device) includes an image display section 20 (a display section) that causes a user to visually recognize a virtual image in a state in which the image display section 20 is worn on the head of the user and a control device 10 that controls the image display section 20. The control device 10 also functions as a controller with which the user operates the HMD 100.

The image display section 20 is a wearing body worn on the head of the user. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, a camera 61 (an image pickup section), and a microphone 63. The right optical-image display section 26 and the left optical-image display section 28 are disposed to be respectively located in front of the right eye and in front of the left eye of the user when the user wears the image display section 20. One end of the right optical-image display section 26 and one end of the left optical-image display section 28 are coupled to each other in a position corresponding to the middle of the forehead of the user when the user wears the image display section 20.

The right holding section 21 is a member provided to extend from an end portion ER, which is the other end of the right optical-image display section 26, to a position corresponding to the temporal region of the user when the user wears the image display section 20. Similarly, the left holding section 23 is a member provided to extend from an end portion EL, which is the other end of the left optical-image display section 28, to a position corresponding to the temporal region of the user when the user wears the image display section 20. The right holding section 21 and the left holding section 23 hold the image display section 20 on the head of the user like temples of eyeglasses.

The right display driving section 22 and the left display driving section 24 are disposed on sides opposed to the head of the user when the user wears the image display section 20. Note that the right display driving section 22 and the left display driving section 24 are also collectively simply referred to as "display driving sections". The right optical-image display section 26 and the left optical-image display section 28 are also collectively simply referred to as "optical-image display sections".

The display driving sections 22 and 24 include liquid crystal displays 241 and 242 (hereinafter referred to as "LCDs 241 and 242") and projection optical systems 251 and 252 explained below with reference to FIG. 2.

The right optical-image display section 26 and the left optical-image display section 28 include light guide plates 261 and 262 (FIG. 2) and dimming plates 20A. The light guide plates 261 and 262 are formed of a light-transmissive resin or the like and guide image lights output by the display driving sections 22 and 24 to the eyes of the user. The dimming plates 20A are thin plate-like optical elements and are disposed to cover the front side of the image display section 20, which is a side opposite to the side of the eyes of the user. As the dimming plates 20A, various dimming plates such as a dimming plate having almost no light transmissivity, a dimming plate nearly transparent, a dimming plate that attenuates a light amount and transmits light, and a dimming plate that attenuates or reflects light having a specific wavelength can be used. By selecting optical characteristics (light transmittance, etc.) of the dimming plates 20A as appropriate, it is possible to adjust an external light amount made incident on the right optical-image display section 26 and the left optical-image display section 28 from the outside and adjust easiness of visual recognition of a virtual image. In this embodiment, the HMD 100 includes the dimming plates 20A at least having light transmissivity enough for enabling the user wearing the HMD 100 to visually recognize an outside scene. The dimming plates 20A protect the right light guide plate 261 and the left light guide plate 262 and suppress damage, adhesion of stain, and the like to the right light guide plate 261 and the left light guide plate 262.

The dimming plates 20A may be detachably attachable to the right optical-image display section 26 and the left optical-image display section 28. In this case, a plurality of kinds of dimming plates 20A may be replaceable and attachable. For example, one kind may be selected from a plurality of kinds of dimming plates having different transmittances of a visible ray and attachable to the image display section 20. The dimming plates 20A may be selected from a plurality of kinds of dimming plates having different colors of transmitted lights (transmission spectra in a visible light region). The image display section 20 may be usable even in a state in which the dimming plates 20A are not attached to the image display section 20.

The camera 61 is disposed in a boundary portion between the right optical-image display section 26 and the left optical-image display section 28. In a state in which the user wears the image display section 20, the position of the camera 61 is substantially the middle of both the eyes of the user in the horizontal direction and is above both the eyes of the user in the vertical direction. The camera 61 is a digital camera including an image pickup device such as a CCD or a CMOS and an image pickup lens and may be either a monocular camera or a stereo camera.

The camera 61 picks up an image of at least a part of an outside scene in a front side direction of the HMD 100, in other words, in a visual field direction of the user in a state in which the HMD 100 is mounted. The breadth of an angle of view of the camera 61 can be set as appropriate. However, it is preferable that an image pickup range of the camera 61 is a range including an outside world that the user visually recognizes through the right optical-image display section 26 and the left optical-image display section 28. Further, it is more preferable that an image pickup range of the camera 61 is set such that the entire visual field of the user through the dimming plates 20A can be picked up.

An illuminance sensor 68 (a light detecting section) is disposed in a frame 2. The illuminance sensor 68 is an ambient light sensor that detects a light amount of external light and outputs a detection value. The illuminance sensor 68 is disposed in the vicinity of the camera 61. The illuminance sensor 68 receives light irradiated from a direction including the angle of view of the camera 61 toward the illuminance sensor 68 and detects a light amount.

In this embodiment, an example is explained in which one illuminance sensor 68 is provided in the frame 2. However, a plurality of illuminance sensors 68 can also be provided. The position of the illuminance sensor 68 is the center in the width direction of the frame 2 as shown in FIG. 1. Besides, the illuminance sensor 68 may be provided at the end portion ER or the end portion EL.

The external light means light made incident on the eyes of the user besides lights emitted by the right display driving section 22 and the left display driving section 24. Specifically, the external light indicates, in light made incident on the eyes of the user, light emitted by a light source different from the right display driving section 22 and the left display driving section 24 shown in FIG. 2. The external light may include either direct light directly made incident from a light source or reflected light.

Figure 2:
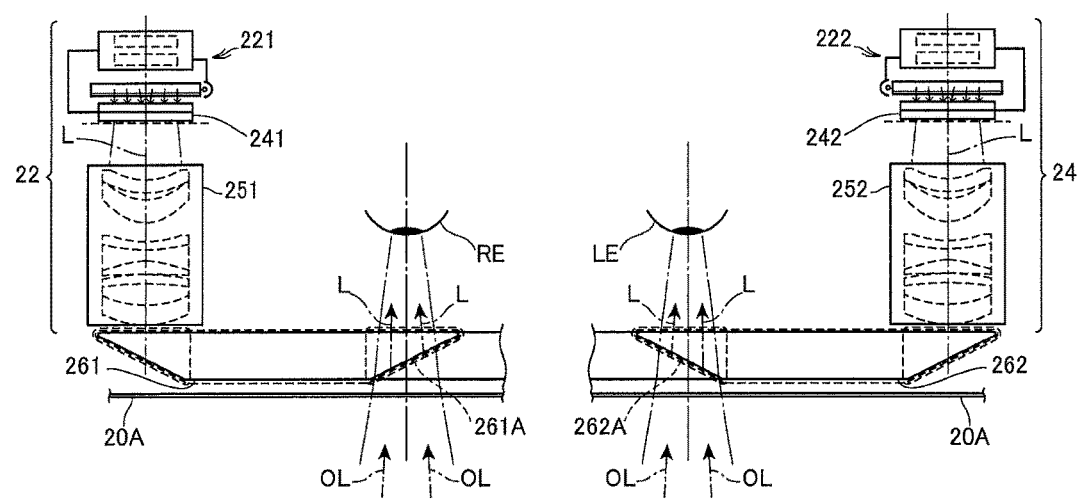
FIG. 2 is a diagram showing the configuration of an optical system of an image display section.

FIG. 2 is a main part plan view showing the configuration of an optical system included in the image display section 20. In FIG. 2, for explanation, a left eye LE and a right eye ER of the user are shown.

The left display driving section 24 includes a left backlight 222 including a light source such as an LED and a diffuser. The left display driving section 24 includes a left LCD 242 of a transmission type disposed on an optical path of light diffused by the diffuser of the left backlight 222 and a left projection optical system 252 including a lens group and the like that guide image light L transmitted through the left LCD 242. The left LCD 242 is a transmission-type liquid crystal panel on which a plurality of pixels are arranged in a matrix shape.

The left projection optical system 252 includes a collimate lens that changes the image light L emitted from the left LCD 242 to light beams in a parallel state. The image light L changed to the light beams in the parallel state by the collimate lens is made incident on the left light guide plate 262 (an optical element). The left light guide plate 262 is a prism on which a plurality of reflection surfaces for reflecting the image light L are formed. The image light L is guided to the left eye LE side through a plurality of times of reflection on the inside of the left light guide plate 262. In the left light guide plate 262, a half mirror 262A (a reflection surface) located in front of the left eye LE is formed.

The image light L reflected on the half mirror 262A is emitted from the left optical-image display section 28 toward the left eye LE. The image light L forms an image on the retina of the left eye LE and causes the user to visually recognize an image.

The right display driving section 22 is configured symmetrically to the left display driving section 24. The right display driving section 22 includes a right backlight 221 including a light source such as an LED and a diffuser. The right display driving section 22 includes a right LCD 241 of a transmission type disposed on an optical path of light diffused by the diffuser of the right backlight 221 and a right projection optical system 251 including a lens group and the like that guide the image light L transmitted through the right LCD 241. The right LCD 241 is a transmission-type liquid crystal panel on which a plurality of pixels are arranged in a matrix shape.

The right projection optical system 251 includes a collimate lens that changes the image light L emitted from the right LCD 241 to light beams in a parallel state. The image light L changed to the light beams in the parallel state by the collimate lens is made incident on the right light guide plate 261 (an optical element). The right light guide plate 261 is a prism on which a plurality of reflection surfaces for reflecting the image light L are formed. The image light L is guided to the right eye RE side through a plurality of times of reflection on the inside of the right light guide plate 261. In the right light guide plate 261, a half mirror 261A (a reflection surface) located in front of the right eye RE is formed.

The image light L reflected on the half mirror 261A is emitted from the right optical-image display section 26 toward the right eye RE. The image light L forms an image on the retina of the right eye RE and causes the user to visually recognize an image.

The image light L reflected on the half mirror 261A and external light OL transmitted through the dimming plate 20A are made incident on the right eye RE of the user. The image light L reflected on the half mirror 262A and the external light OL transmitted through the dimming plate 20A are made incident on the left eye LE. In this way, the HMD 100 makes the image light L of the image processed on the inside and the external light OL incident on the eyes of the user to be placed one on top of the other. For the user, the outside scene is seen through the dimming plates 20A. The image formed by the image light L is visually recognized over the outside scene. In this way, the HMD 100 functions as a see-through type display device.

Note that the left projection optical system 252 and the left light guide plate 262 are also collectively referred to as "left light guide section". The right projection optical system 251 and the right light guide plate 261 are also collectively referred to as "right light guide section". The configuration of the right light guide section and the left light guide section is not limited to the example explained above. Any system can be used as long as a virtual image is formed in front of the eyes of the user using image light. For example, a diffraction grating may be used or a transreflective film may be used.

The illuminance sensor 68 detects external light in an outside scene direction transmitted through the right light guide plate 261 and the left light guide plate 262 and visually recognized by the user. That is, the illuminance sensor 68 is attached to the frame 2 to receive the external light OL. That is, the illumination sensor 68 detects the external light OL made incident on the eyes of the user as background light of the image light L.

The image display section 20 (FIG. 1) is connected to the control device 10 via a connecting section 40. The connecting section 40 is a harness including a main body cord 48 connected to the control device 10, a right cord 42, a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The right cord 42, the left cord 44, and the main body cord 48 only have to be cords capable of transmitting digital data and can be configured by, for example, a metal cable or an optical fiber. The right cord 42 and the left cord 44 may be collected as one cord.

The coupling member 46 is provided at a branching point of the main body cord 48 and the right cord 42 and the left cord 44 and includes a jack for connecting an earphone plug 30. A right earphone 32 and a left earphone 34 extend from the earphone plug 30. The microphone 63 is provided in the vicinity of the earphone plug 30. Cords between the earphone plug 30 and the microphone 63 are collected as one cord. Cords branch from the microphone 63 and are respectively connected to the right earphone 32 and the left earphone 34.

For example, as shown in FIG. 1, the microphone 63 is disposed to direct a sound collecting section of the microphone 63 to a visual line direction of the user. The microphone 63 collects sound and outputs a sound signal. The microphone 63 may be, for example, a monaural microphone or a stereo microphone, may be a microphone having directivity, or may be a nondirectional microphone.

The image display section 20 and the control device 10 transmit various signals via the connecting section 40. Connectors (not shown in the figure), which fit with each other, are respectively provided at an end portion of the main body cord 48 on the opposite side to the coupling member 46 and in the control device 10. The control device 10 and the image display section 20 can be connected and disconnected by fitting and unfitting the connector of the main body cord 48 and the connector of the control device 10.

The control device 10 includes a box-shaped main body separate from a main body of the image display section 20 and controls the HMD 100. The control device 10 includes a determination key 11, a lighting section 12, a display switching key 13, a luminance switching key 15, a direction key 16, a menu key 17, and switches including a power switch 18. The control device 10 includes a track pad 14 operated by the user with a finger.

The determination key 11 detects depression operation and outputs a signal for determining content of the operation in the control device 10. The lighting section 12 includes a light source such as an LED (Light Emitting Diode) and notifies an operation state (e.g., ON/OFF of a power supply) of the HMD 100 according to a lighting state of the light source. The display switching key 13 outputs, according to the depression operation, for example, a signal for instructing switching of a display mode of an image.

The track pad 14 includes an operation surface for detecting contact operation and outputs an operation signal according to operation on the operation surface. A detection system on the operation surface is not limited. An electrostatic system, a pressure detection system, an optical system, and the like can be adopted. The luminance switching key 15 outputs, according to the depression operation, a signal for instructing an increase or a reduction in the luminance of the image display section 20. The direction key 16 outputs an operation signal according to depression operation on the key corresponding to the upward, downward, left, and right directions. The power switch 18 is a switch for switching power ON/OF of the HMD 100.

Figure 3:
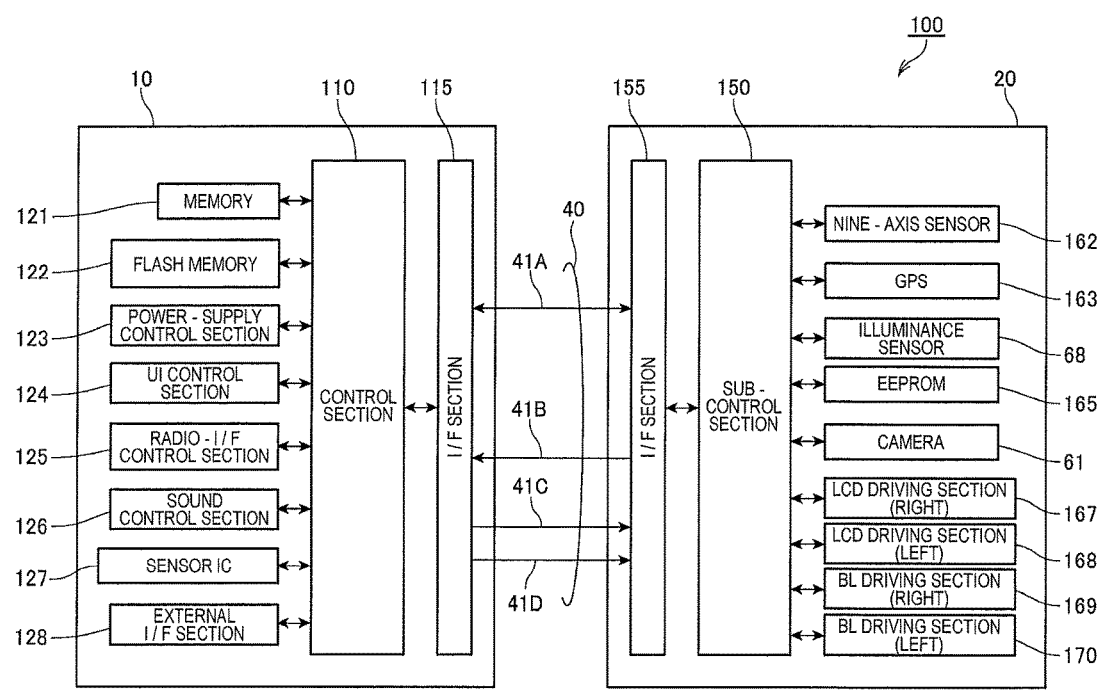
FIG. 3 is a functional block diagram of sections configuring the head-mounted display device.

FIG. 3 is a functional block diagram of the sections included in the HMD 100.

The control device 10 includes a control section 110 (a second control section) that controls the control device 10 and the image display section 20. The control section 110 is configured by, for example, a microprocessor and is connected to a memory 121 that temporarily stores data and the like processed by the control section 110 and a flash memory 122 that stores, in a nonvolatile manner, data and the like processed by the control section 110. Both of the memory 121 and the flash memory 122 are configured by semiconductor elements and are connected to the control section 110 via a data bus.

A power-supply control section 123, a UI (user interface) control section 124, a radio-I/F (interface) control section 125, a sound control section 126, a sensor IC 127, and an external I/F (interface) section 128 are connected to the control section 110.

The HMD 100 includes a primary battery or a secondary battery as a power supply. The power-supply control section 123 is configured by an IC connected to the battery. The power-supply control section 123 performs detection of a residual capacity of the battery according to the control by the control section 110 and outputs data indicating that the residual capacity is equal to or smaller than a setting value to the control section 110.

The UI control section 124 is an IC to which the operation sections including the determination key 11, the display switching key 13, the luminance switching key 15, the direction key 16, and the menu key 17, the lighting section 12, and the track pad 14 are connected. The operation sections function as input sections. The lighting section 12 and the track pad 14 function as output sections. The operation sections and the lighting section 12 and the track pad 14 configure a user interface of the HMD 100. The UI control section 124 detects operation in the operation sections and outputs operation data corresponding to the operation to the control section 110. The UI control section 124 performs, according to the control by the control section 110, lighting/extinction of the lighting section 12, and display in the track pad 14.

The radio-I/F control section 125 is a control IC connected to a radio communication interface (not shown in the figure). The radio-I/F control section 125 executes communication by the radio communication interface according to the control by the control section 110. The radio communication interface included in the control device 10 executes radio data communication conforming to a standard such as a wireless LAN (WiFi (registered trademark)), Miracast (registered trademark), or Bluetooth (registered trademark).

The sound control section 126 is an IC connected to the right earphone 32, the left earphone 34, and the microphone 63 and including an A/D (analog/digital) converter and an amplifier. The sound control section 126 causes, on the basis of sound data input from the control section 110, the right earphone 32 and the left earphone 34 to output sound. The sound control section 126 generates sound data on the basis of sound collected by the microphone 63 and outputs the sound data to the control section 110.

The sensor IC 127 includes, for example, a three-axis acceleration sensor, a three-axis gyro sensor, and a three-axis terrestrial magnetism sensor. The sensor IC 127 is configured by one IC including the sensors. The sensor IC 127 executes detection according to the control by the control section 110 and outputs data indicating detection values of the sensors to the control section 110. The number and the types of the sensors included in the sensor IC 127 are not limited. The sensor IC 127 may include an illuminance sensor, a temperature sensor, and a pressure sensor.

The external I/F section 128 is an interface for connecting the HMD 100 to an external apparatus. For example, an interface corresponding to wired connection such as a USB interface, a micro USB interface, or an interface for a memory card can be used. The external I/F section 128 may be configured by a radio communication interface. Various external apparatuses that supply contents to the HMD 100 can be connected to the external I/F section 128. The external apparatuses can also be referred to as image supply apparatuses that supply images to the HMD 100. For example, a personal computer (PC), a cellular phone terminal, a portable game machine, and the like are used. Terminals connected to the right earphone 32, the left earphone 34, and the microphone 63 can also be provided in the external I/F section 128. In this case, an analog sound signal processed by the sound control section 126 is input and output via the external I/F section 128.

An I/F (interface) section 115 is connected to the control section 110. The I/F section 115 is an interface including a connector or the like connected to one end of the connecting section 40. The other end of the connecting section 40 is connected to an I/F section 155 of the image display section 20.

The control section 110 executes, via the connecting section 40, data communication with a sub-control section 150 included in the image display section 20.

The control section 110 executes a computer program stored in a ROM incorporated therein and controls the sections of the HMD 100. The control section 110 acquires detection values of the sensors on the basis of data input from the sensor IC 127 and stores the detection value in the memory 121. At this point, the control section 110 additionally stores, in association with the detection values of the sensors, time stamp information indicating time when the detection values are acquired.

The control section 110 receives, via the connecting section 40, data indicating detection values of the sensors (the illuminance sensor 68, a nine-axis sensor 162, and a GPS 163) included in the image display section 20. The control section 110 stores the received data in the memory 121. The data received by the control section 110 includes the time stamp information added by the sub-control section 150. The control section 110 adds the time stamp information added to the detection values of the sensor IC 127 explained above in a form that can be distinguished from the time stamp information added by the sub-control section 150 and stores the time stamp information in the memory 121. In the memory 121, the detection values of the sensors are stored in a data format to which the time stamp information is added as one of attributes of data. The control section 110 may store data of the detection values of the sensors in the flash memory 122.

The control section 110 receives data of contents from an external apparatus connected by the external I/F section 128 or the radio I/F control section 125 and stores the data in the flash memory 122. The data of the contents is data such as a text or an image to be displayed on the image display section 20 and may include data of sound to be output by the right earphone 32 and the left earphone 34. The control section 110 controls the HMD 100 and reproduces the contents. Specifically, the control section 110 transmits data for display of the contents to the sub-control section 150, causes the sub-control section 150 to execute display, outputs sound data of the contents to the sound control section 126, and causes the sound control section 126 to output sound. When the data of the contents received from the external apparatus includes data indicating a condition concerning reproduction, the control section 110 reproduces the contents according to this condition. For example, when a detection value of a sensor for a position, a tilt, or the like detected by the image display section 20 corresponds to the condition, the control section 110 causes the image display section 20 to display a text and an image corresponding to the detection value.

The image display section 20 includes the sub-control section 150 that executes communication with the control section 110 and controls the sections of the image display section 20. The sub-control section 150 is configured by, for example, a microprocessor and connected to the connecting section 40 by the I/F section 155. The sub-control section 150 executes data communication with the control section 110 via the connecting section 40.

Sensors such as the illuminance sensor 68, the nine-axis sensor 162, and the GPS 163 are connected to the sub-control section 150. The illuminance sensor 68 is an IC of the ambient light sensor (ALS) described above or an IC obtained by unitizing a plurality of sensors including the ambient light sensor and peripheral circuits of the sensors. The nine-axis sensor 162 is an IC including a three-axis acceleration sensor, a three-axis gyro sensor, and a three-axis terrestrial magnetism sensor.

The illuminance sensor 68 is driven by the control by the sub-control section 150 and outputs a detection value of a light amount to the sub-control section 150. The nine-axis sensor 162 is driven by the control by the sub-control section 150 and outputs data indicating detection values of the sensors incorporated therein to the sub-control section 150.

The GPS 163 receives a signal for position detection transmitted by a GPS satellite or a pseudo GPS transmitter (not shown in the figure) set indoors, calculates the present position of the image display section 20, and outputs the calculated data to the sub-control section 150. The GPS 163 may be configured to have only a function of a receiver that receives the signal for position detection. In this case, the sub-control section 150 only has to perform processing for calculating the present position on the basis of the data output by the GPS 163.

An EEPROM 165 (a setting-data storing section) stores, in a nonvolatile manner, data and the like related to processing executed by the sub-control section 150.

The camera 61 is connected to the sub-control section 150. The sub-control section 150 controls the camera 61 to execute image pickup and transmits picked-up image data of the camera 61 to the control section 110.

An LCD driving section 167 that drives the right LCD 241 to perform rendering and an LCD driving section 168 that drives the left LCD 242 to perform rendering are connected to the sub-control section 150. The sub-control section 150 receives data of contents from the control section 110, generates display data for displaying a text and an image included in the received data, outputs the display data to the LCD driving sections 167 and 168, and causes the LCD driving sections 167 and 168 to execute display.

The sub-control section 150 is connected to a backlight driving section 169 that drives the right backlight 221 and a backlight driving section 170 that drives the left backlight 222. The sub-control section 150 outputs control data including timing data for PWM control to the backlight driving sections 169 and 170. The backlight driving sections 169 and 170 supply, on the basis of the control data input from the sub-control section 150, driving voltages and pulses to the right backlight 221 and the left backlight 222 and light the right backlight 221 and the left backlight 222.

The sub-control section 150 designates, according to the data output to the backlight driving section 169, pulse width or duty of a pulse output to the right backlight 221 by the backlight driving section 169. The duty indicates a ratio of an ON period and an OFF period of the pulse. Similarly, the sub-control section 150 designates, according to the data output to the backlight driving section 170, pulse width or duty of a pulse output to the left backlight 222 by the backlight driving section 170. The right backlight 221 and the left backlight 222 are solid-state light sources such as LEDs and can adjust brightness, that is, luminance of light emission according to PWM control. Therefore, it is possible to adjust, according to the control by the sub-control section 150, a light amount of the image light L (FIG. 2) made incident on the eyes of the user. The sub-control section 150 can output different data respectively to the backlight driving section 169 and the backlight driving section 170 and individually adjust the luminances of the right backlight 221 and the left backlight 222.

The backlight driving section 169 can adjust the luminance of the right backlight 221 stepwise. The backlight driving section 170 can also adjust the luminance of the left backlight 222 stepwise. In this embodiment, a configuration capable of adjusting luminance in 256 stages is explained as an example. The sub-control section 150 outputs data for respectively designating the luminances of the right backlight 221 and the left backlight 222 to the backlight driving sections 169 and 170. The data is luminance values of 0 to 255 indicating the stages of the luminances. The backlight driving sections 169 and 170 generate pulses corresponding to the luminance values designated by the data input from the sub-control section 150 and output the pulses respectively to the right backlight 221 and the left backlight 222.

In the sub-control section 150, luminance values set by taking into account luminances suitable for display, gamma values of the right LCD 241 and the left LCD 242, and the like are set as initial values.

The connecting section 40 that connects the control section 110 and the sub-control section 150 includes a plurality of data buses including a control data bus 41A, an image data bus 41B, and display data buses 41C and 41D. The data buses can transmit data independently from one another. However, signal lines configuring the data buses may be physically divided or the data buses may be virtually or logically configured using a common signal line.

The control data bus 41A transmits the control data transmitted from the control section 110 to the sub-control section 150, the data of the detection values of the sensors transmitted to the control section 110 by the sub-control section 150, and the like. The image data bus 41B transmits the picked-up image data of the camera 61 from the sub-control section 150 to the control section 110. The display data bus 41C transmits data to be displayed by the right display driving section 22. The display data bus 41D transmits data to be displayed by the left display driving section 24.

Sampling cycles of a plurality of sensors including the illuminance sensor 68, the nine-axis sensor 162, and the GPS 163 included in the image display section 20 are sometimes greatly different from one another. For example, it is conceivable that a sampling cycle (a sampling frequency) of the acceleration sensor of the nine-axis sensor 162 is 200 times/second or more. On the other hand, it is conceivable that a sampling cycle of the illuminance sensor 68 is lower and a sampling cycle of 1 to 10 times/second (a 1000 to 100 ms cycle) is sufficiently useful. The sub-control section 150 sets sampling frequencies of these sensors. The sub-control section 150 acquires detection values of the sensors according to the set sampling frequencies. The sub-control section 150 transmits data of the detection values sampled from the sensors to the control section 110 in a time division manner through the control data bus 41A.

Therefore, the control data bus 41A is not occupied for a long time in order to control a sensor having a low sampling cycle (in other words, having a low sampling frequency or a long sampling interval). Consequently, it is possible to reduce an overhead of the control data bus 41A and efficiently transmit detection values of a large number of sensors through the control data bus 41A. The sub-control section 150 incorporates a RAM (not shown in the figure) and, when a detection value of a sensor is acquired, temporarily stores the detection value in the RAM. The sub-control section 150 adjusts transmission timing of data stored in the RAM and delivers the data to the control data bus 41A. Therefore, the operation of the sub-control section 150 is less easily affected by limitation of the sampling cycles of the sensors. It is possible to prevent a situation in which the processing by the sub-control section 150 is occupied for the control of the sensors.

Figures 4A, 4B:
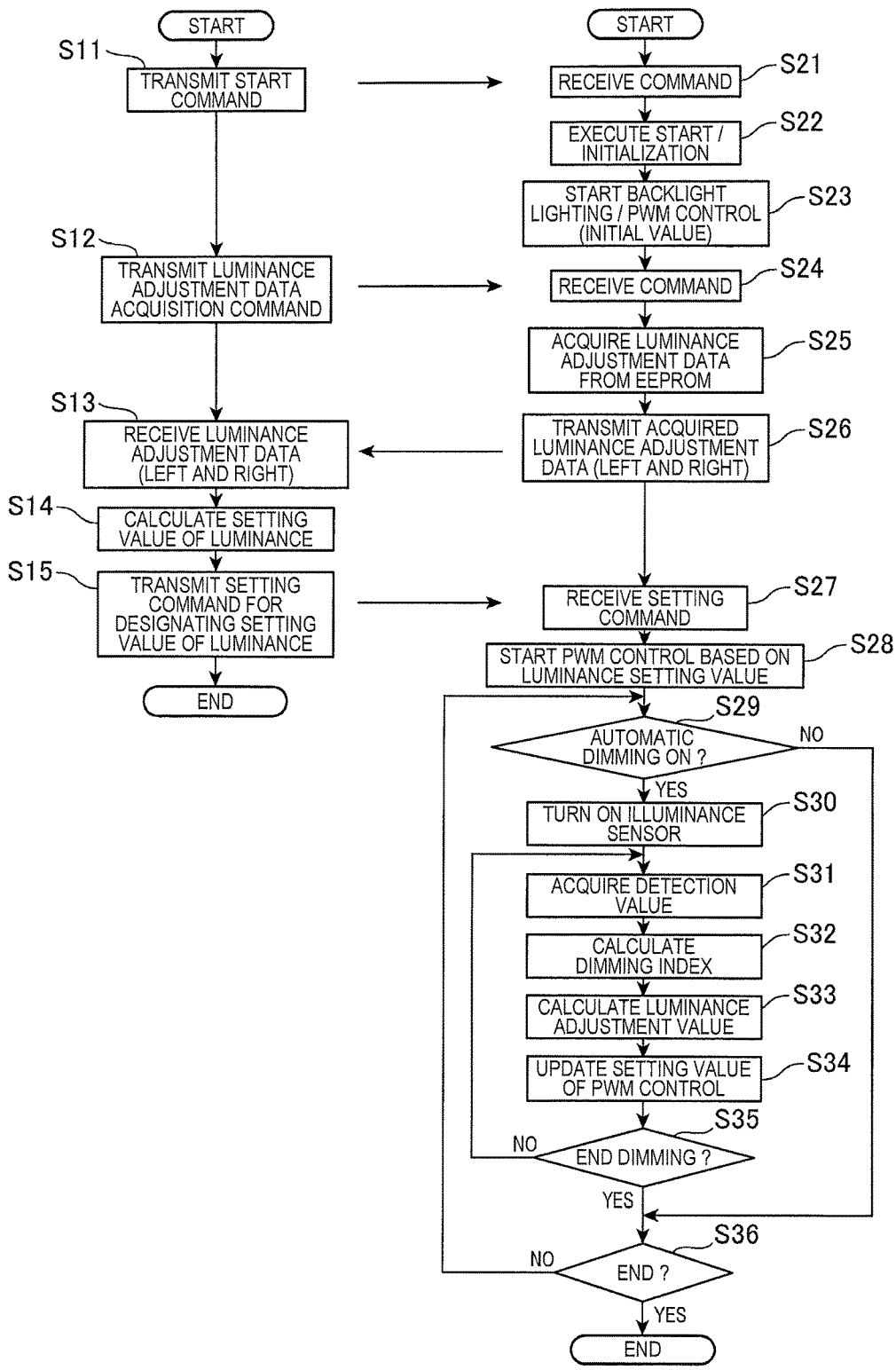

FIGS. 4A and 4B are flowcharts for explaining the operation of the HMD 100. FIG. 4A shows the operation of the control device 10. FIG. 4B shows the operation of the image display section 20.

When the start of a display operation is instructed by operation on the control device 10, the control section 110 generates a start command and transmits the start command to the sub-control section 150 (step S11). The command is transmitted via the control data bus 41A. The sub-control section 150 receives the command (step S21).

The sub-control section 150 starts operation and performs initialization of the sub-control section 150 and performs initialization of the sections of the image display section 20 including the illuminance sensor 68, the nine-axis sensor 162, and the GPS 163 according to the command (step S22). Subsequently, the sub-control section 150 causes the backlight driving sections 169 and 170 to operate and lights the right backlight 221 and the left backlight 222 (step S23). In step S23, the sub-control section 150 outputs data of initial values as data for PWM control for the backlight driving sections 169 and 170. The sub-control section 150 starts the camera 61, the nine-axis sensor 162, the GPS 163, and the like according to necessity.

Subsequently, the control section 110 generates a command for instructing acquisition of data for luminance adjustment and transmits the command to the sub-control section 150 (step S12).

The sub-control section 150 receives a command transmitted by the control section 110 (step S24) and reads out and acquires luminance adjustment data, which is data for luminance adjustment, from the EEPROM 165 according to the received command (step S25). The sub-control section 150 transmits the acquired luminance adjustment data to the control section 110 (step S26). The control section 110 receives the luminance adjustment data transmitted by the sub-control section 150 (step S13).

The luminance adjustment data is initial values for adjusting the luminances of the right backlight 221 and the left backlight 222. For example, because of individual differences of the light sources such as the LED respectively included in the right backlight 221 and the left backlight 222, fluctuation in the luminances of the right backlight 221 and the left backlight 222 sometimes occurs. In this case, if the backlight driving sections 169 and 170 output the same pulse to the right backlight 221 and the left backlight 222, it is likely that a light amount of the image light L made incident on the right eye of the user and a light amount of the image light L made incident on the left eye of the user are not aligned to cause a sense of discomfort. The luminance adjustment data is data for aligning the luminance of the right backlight 221 and the luminance of the left backlight 222 to prevent the user from feeling the fluctuation in the display luminances of the right optical-image display section 26 and the left optical-image display section 28. The luminance adjustment data is set in advance and stored in the EEPROM 165. For example, the luminance adjustment data is obtained by an inspection during shipment of the HMD 100 and stored in the EEPROM 165.

The control section 110 calculates setting values of the luminances on the basis of the luminance adjustment data received from the sub-control section 150 (step S14). Subsequently, the control section 110 transmits a setting command for designating setting values of the luminances and data indicating the calculated setting values of the luminances to the sub-control section 150 (step S15). The setting values calculated by the control section 110 in step S14 are values that are sources of data output to the backlight driving sections 169 and 170 by the sub-control section 150. The setting values are values obtained by applying, to the initial values (default values) of the luminances of the right backlight 221 and the left backlight 222, correction for preventing the user from feeling a difference between the left and right luminances.

The sub-control section 150 receives the setting command and the data transmitted from the control section 110 (step S27) and starts the PWM control of the right backlight 221 and the left backlight 222 according to the received setting values (step S28). That is, the sub-control section 150 generates data for the PWM control, outputs the data to the backlight driving sections 169 and 170, and adjusts the luminances of the right backlight 221 and the left backlight 222.

Further, the sub-control section 150 determines whether automatic dimming is performed (step S29). The automatic dimming is processing for adjusting the brightness of the display of the right optical-image display section 26 and the left optical-image display section 28 according to the brightness of the outside of the HMD 100. Whether the automatic dimming is performed is set in advance. Data indicating a setting state is stored in, for example, the flash memory 122 or the EEPROM 165.

If the automatic dimming is performed (YES in step S29), the sub-control section 150 starts the illuminance sensor 68 and causes the illuminance sensor 68 to start detection of a light amount (step S30). Subsequently, the sub-control section 150 acquires a detection value of the illuminance sensor 68 (step S31) and calculates a dimming index (a correction coefficient) on the basis of the acquired detection value of the illuminance sensor 68 (step S32).

The dimming index can be calculated by, for example, an arithmetic operation indicated by the following Expression (1).

$$X = A \times Q^B + C \quad (1)$$

In the expression, X represents a dimming index and A, B, and C represent constants. Q represents average ambient illuminance (unit is [lux]) calculated from the detection value of the illuminance sensor 68.

The Expression (1) and the constants A, B, and C are stored in, for example, the EEPROM 165 in advance.

The constants A, B, and C are decided to set the dimming index X to 1, for example, when the average ambient illuminance Q is 400 lux, which is an average indoor environment, or a value near 400 lux. For example, $0 < A \leq 1$, $0 < B \leq 1$, and $0 \leq C \leq 1$.

The sub-control section 150 may perform the arithmetic operation of the Expression (1) directly using the detection value of the illuminance sensor 68 as a value of the average ambient illuminance Q or may acquire detection values a plurality of times from the illuminance sensor 68 in a period set in advance and sets an average of the acquired detection values as the value of the average ambient illuminance Q. The detection values of the illuminance sensor 68 or the average of the detection values may be converted into the average ambient illuminance Q according to arithmetic processing set in advance.

Further, the sub-control section 150 may perform noise filtering for the detection values of the illuminance sensor 68 and calculate the average ambient illuminance Q. For example, the length of time for acquiring the detection values of the illuminance sensor 68 is set as an illuminance acquisition time (unit is [second]) in advance. The sub-control section 150 acquires detection values (illuminances) at a predetermined sampling cycle in the illuminance acquisition time. The sub-control section 150 averages the acquired detection values excluding a predetermined number of largest values and a predetermined number of smallest values and calculates the average ambient illuminance. The number of values trimmed from the detection values is set in advance or the control section 110 sets the number in the sub-control section 150 according to a setting command.

Subsequently, the sub-control section 150 calculates luminance adjustment values (step S33). The luminance adjustment values are values obtained by correcting, before dimming control, with the dimming index X, the luminance values set in the backlight driving sections 169 and 170 by the sub-control section 150. The luminance adjustment values can be calculated by, for example, an arithmetic operation indicated by the following Expression (2).

$$\text{Luminance adjustment values} = \text{luminance values} \times \text{dimming index } X \quad (2)$$

The luminance values are the luminance values calculated by the control section 110 in step S14 on the basis of the luminance adjustment data stored in the EEPROM 165 and are values obtained by taking into account individual differences and the like of the right backlight 221 and the left backlight 222. However, the detection value of the illuminance sensor 68 is not reflected on the illuminance values. For example, the illuminance values are written in a register of the sub-control section 150 according to the setting command transmitted by the control section 110 in step S15. The sub-control section 150 multiplies the luminance values by the dimming index to change, according to the luminance of the external light, in other words, the ambient illuminance, the data of the luminance values output to the backlight driving sections 169 and 170. Specifically, the sub-control section 150 updates the values of the illuminance values written in the register to the luminance adjustment values calculated by Expression (2). When dimming processing is executed in a loop as explained below, the sub-control section 150 updates the luminance adjustment values written in the register.

Concerning the luminance adjustment values, the values calculated by Expression (2) may be directly used. However, the values may be adjusted. For example, if the luminance values before being multiplied by the dimming index are not 0, a minimum value of the luminance adjustment values may be set to 1 to correct the values calculated by Expression (2).

When the correction coefficient is calculated by the arithmetic processing in Expression (1), the detection value of the illuminance sensor 68 may be converted into the correction coefficient on the basis of a predetermined correction curve. In this case, the correction curve may be set to be different for each scene. In this case, for example, a scene is selected by operation by the user on the control device 10 and the correction coefficient is calculated according to a correction curve corresponding to the selected scene, that is, a function equivalent to Expression (1). The sub-control section 150 may automatically determine a scene on the basis of the detection value of the illuminance sensor 68 and a change with time of the detection value.

Examples of specific scenes include the following scenes.

[1] A "low illuminance environment mode" for making it easy to see an image and a video displayed by the right optical-image display section 26 and the left optical-image display section 28 and an outside scene even under a low illuminance environment.

[2] An "external world/video compatible mode" for making it easy to see a text, an image and a video displayed by the right optical-image display section 26 and the left optical-image display section 28 and an outside scene in a bright room such as a living room and suitable for display of, for example, a business document.

[3] A "theater appreciation mode" for increasing the visibility of an image and a video displayed by the right optical-image display section 26 and the left optical-image display section 28 and reducing the visibility of an outside scene and suitable for, for example, viewing of a movie.

[4] A "fine-weather document browsing mode" for, under a bright environment such as the outdoor in fine weather, securing the visibility of a text and an image displayed by the right optical-image display section 26 and the left optical-image display section 28 and enabling the user to read a manual such as a work instruction, for example, under the blazing sun in summer.

The sub-control section 150 may calculate the dimming index using, instead of the arithmetic processing indicated by Expression (1), an LUT (Look Up Table) for associating the detection value of the illuminance sensor 68 and the dimming index. When the LUT is an LUT for setting a dimming index for a representative value of the illuminance sensor 68, the sub-control section 150 may calculate the dimming index corresponding to the detection value of the illuminance sensor 68 with an interpolation operation. Further, the sub-control section 150 may calculate the luminance adjustment value using, instead of the arithmetic processing indicated by Expression (2), an LUT for calculating the luminance adjustment value on the basis of the dimming index and a currently set luminance value. When the LUT includes the representative value, the sub-control section 150 may perform the interpolation operation. These LUTs may be stored in advance in, for example, the EEPROM 165 or the flash memory 122.

LUTs may be stored in advance for each of the scenes to correspond to the scenes illustrated in [1] to [4]. The sub-control section 150 may select an LUT corresponding to a scene and calculate the correction coefficient.

That is, the sub-control section 150 updates the data output by the backlight driving sections 169 and 170 to data of the luminance adjustment value calculated in step S33 (step S34). Consequently, the pulses respectively output to the right backlight 221 and the left backlight 222 by the backlight driving sections 169 and 170 are changed to pulses corresponding to the luminance adjustment value.

Thereafter, the sub-control section 150 determines whether to end the dimming processing (step S35). If determining not to end the dimming processing (NO in step S35), the sub-control section 150 returns to step S31. Consequently, the loop of the dimming processing is continued. The luminances of the right backlight 221 and the left backlight 222 are adjusted at any time reflecting the detection value of the illuminance sensor 68.

When the end of the dimming processing is instructed by the operation of the control device 10 or when the illuminances of the right backlight 221 and the left backlight 222 are set by manual operation, the sub-control section 150 determines to end the dimming processing (YES in step S35). In this case, the sub-control section 150 determines whether to end the display processing (step S36). If not to end the display processing (NO in step S36), the sub-control section 150 returns to step S29. When the end of the display processing is instructed by the operation of the display device 10 or when the HMD 100 is turned off by the power switch 18 of the control device 10, the sub-control section 150 determines to end the display processing and stops (YES in step S36).

In this way, the image light L made incident on the eyes of the user from the right light guide plate 261 and the left light guide plate 262 is adjusted according to the ambient illuminance detected by the illuminance sensor 68. Therefore, it is possible to satisfactorily keep the visibility of the image displayed by the image display section 20. The visibility of images displayed on the see-through half mirrors 261A and 262A is affected by the intensity and a light amount of the external light OL. However, since the sub-control section 150 performs the operation shown in FIGS. 4A and 4B, it is possible to seamlessly cope with a change in the ambient illuminance on a real time basis.

Note that, when the luminance values or the luminance adjustment values are updated in step S34 with the detection value of the illuminance acquired in step S31, intermediate steps may be inserted by the number of times of designation in order to reduce a sudden change in luminance. In this case, when the luminance adjustment values are changed (updated), luminances in one or a plurality of intermediate steps are set while the luminances of the right backlight 221 and the left backlight 222 are changed from the luminance adjustment values before the change to the luminance adjustment values after the change. Consequently, the luminances of the right backlight 221 and the left backlight 222 change stepwise.

In the sub-control section 150, the number of times of light adaptation is set as the number of times of intermediate steps in increasing the luminance values from a low state. The number of times of light adaptation is set as the number of times of intermediate steps in reducing the luminance values from a high state. A dimming time is set as time in which the intermediate steps are performed.

For example, if the dimming index calculated in step S32 is a first value P1 and a dimming index calculated before step S32 is a second value P2 (P2<P1), the luminance values change in every dimming time by an intermediate value indicated by the following Expression (3).

$$\text{Intermediate value} = (P1-P2)/\text{the number of times of light adaptation} \quad (3)$$

If P1<P2, the luminance values change in every dimming time by an intermediate value indicated by the following Expression (4).

$$\text{Intermediate value} = (P2-P1)/\text{the number of times of dark adaptation} \quad (4)$$

According to this processing, even if the ambient illuminance detected by the illuminance sensor 68 suddenly changes, a change in a light amount of the image light L made incident on the eyes of the user is relaxed. Therefore, feeling of use is not spoiled.

As indicated by Expressions (3) and (4), in the HMD 100, the numbers of times of intermediate steps (the number of times of light adaptation and the number of times of dark adaptation) are independently set respectively for the light adaptation and the dark adaptation. The dimming times may be set respectively for the light adaptation and the dark adaptation. Therefore, when the sub-control section 150 changes the luminance of display to be high, processing is performed according to the number of times of intermediate steps and the dimming time set for the light adaptation. When the luminance of display is changed to be low, processing is performed according to the number of times of intermediate steps and the dimming time set for the dark adaptation.

In this way, concerning both of the light adaptation and the dark adaptation, hysteresis can be set for a change in luminance. Therefore, for example, when the brightness around the user greatly changes, by appropriately changing the luminance of display, it is possible to suppress a decrease in the visibility of an outside scene and secure the visibility. Since a sense of security of the user can be improved, this is effective in the HMD 100 with which the outside scene can be visually recognized in a see-through manner. This is particularly effective in a method of using the HMD 100 while moving wearing the HMD 100.

Further, hysteresis can be independently set respectively for the light adaptation and the dark adaptation. Therefore, there is an advantage that it is possible to more appropriately set a change in luminance The sub-control section 150 controls the sensors such as the illuminance sensor 68, the nine-axis sensor 162, and the GPS 163 to acquire the detection values and transmits the detection values to the control section 110. Therefore, compared with when the control section 110 controls the sensors, it is possible to substantially reduce a processing load of the control section 110 and an occupancy time of the processing by the control section 110. When the sensors are connected to the control section 110, since it is difficult to transmit, through the same signal line, detection values of the sensors having the different sampling cycles, the number of signal lines provided in the connecting section 40 increases according to the number of sensors. Therefore, there is a concern about undesirable situations; for example, the harness of the connecting section 40 increases in thickness and handling of the harness is deteriorated and the number of sensors is limited. In this embodiment, the sub-control section 150 acquires the detection values of the sensors, adjusts the timing of transmission via the control data bus 41A, and transmits the detection values of the plurality of sensors. Therefore, it is possible to prevent all of these situations and realize efficient processing. For example, the sub-control section 150 may preferentially perform, at timing set in advance, an operation for transmitting a detection value of a sensor having a short sampling cycle and transmit, in an idle time of this operation, a detection value of a sensor having a long sampling cycle.

According to the ambient illuminance detected by the illuminance sensor 68, the sub-control section 150 executes the dimming processing in steps S30 to S34. Therefore, it is possible to perform the dimming without increasing a load of the control section 110 and without increasing an amount of data transmitted via the connecting section 40.

As explained above, the HMD 100 in the first embodiment applied with the invention includes the image display section 20 that is mounted on the head of the user and irradiates image light on the eyes of the user and the illuminance sensor 68 that detects light. The HMD 100 includes the sub-control section 150. The sub-control section 150 performs adjustment processing for adjusting the luminance of display of the image display section 20 according to a luminance value set by the control section 110. The sub-control section 150 executes the dimming processing (the correction processing) for calculating a dimming index on the basis of a detection value of the illuminance sensor 68 and correcting the luminance of the display of the image display section 20. Therefore, it is possible to easily execute the processing for adjusting the luminance of the display and the processing for changing the luminance of the display on the basis of the detection value of the illuminance sensor 68. Therefore, it is possible to appropriately adjust the luminance of the display through processing with a light load.

The sub-control section 150 calculates a correction coefficient by applying the detection value of the illuminance sensor 68 to, for example, the arithmetic expression set in advance as indicated by Expression (1). Therefore, it is possible to easily execute the processing for changing the luminance of the display. The sub-control section 150 may calculate the correction coefficient corresponding to the detection value of the illuminance sensor 68 using an LUT.

The sub-control section 150 multiplies, through the dimming processing, the luminance values of the right backlight 221 and the left backlight 222 set in step S28 by a dimming index and corrects the luminance value of the display of the image display section 20. Therefore, it is possible to reflect the detection value of the illuminance sensor 68 on the adjusted luminance of the display and adjust the luminance.

The sub-control section 150 executes the hysteresis processing when the luminance value of the display of the image display section 20 is changed to the corrected luminance value. It is possible to set conditions of the hysteresis processing independently when the luminance value of the display of the image display section 20 is changed to the high luminance side and when the luminance value is changed to the low luminance side. Therefore, when the detection value of the illuminance sensor 68 changes, it is possible to satisfactorily maintain visibility for the user. It is possible to perform setting of hysteresis independently when the luminance value of the image display section 20 is increased and when the luminance value is reduced. Therefore, it is possible to perform the setting of the hysteresis according to characteristics of the eyes of a human or according to preference of the user and an environment of use of the display device.

The image display section 20 includes an image display section for right eye that irradiates image light on the right eye of the user and an image display section for left eye that irradiates image light on the left eye of the user. The sub-control section 150 sets the luminance of the right backlight 221 of the image display section for right eye and the luminance of the left backlight 222 of the image display section for left eye independently from each other. Therefore, it is possible to adjust the luminances according to the respective left and right eyes. It is possible to reflect the detection value of the illuminance sensor 68 on the adjusted luminances and appropriately adjust the luminances.

The image display section 20 is the image display section of the see-through type that transmits the external light OL and makes the external light OL incident on the eyes of the user. Therefore, by adjusting the luminance according to a light amount of the external light that greatly affects the luminance of the display, it is possible to satisfactorily keep the visibility of the display.

Further, as in the embodiment, it is preferable that the illuminance sensor 68 is configured to detect light from a direction of visual recognition of the user through the image display section 20.

In this embodiment, as an example of the main body, the frame 2 of the eyeglass type is illustrated. The shape of the main body is not limited to the eyeglass type and only has to be worn on the head of the user and fixed. It is more preferable that the shape of the main body is a shape worn across the front of the left and right eyes of the user. For example, besides the eyeglass type explained above, the main body may have a shape like snow goggles that cover an upper part of the face of the user or may be a shape disposed in front of the respective left and right eyes of the user like a binocular.

In this embodiment, the configuration in which the illuminance sensor 68 and the camera 61 are fixedly provided in the frame 2 is explained as an example. However, the camera 61 may be configured to be displaceable. This example is explained as a second embodiment.

Second Embodiment

Figure 5:
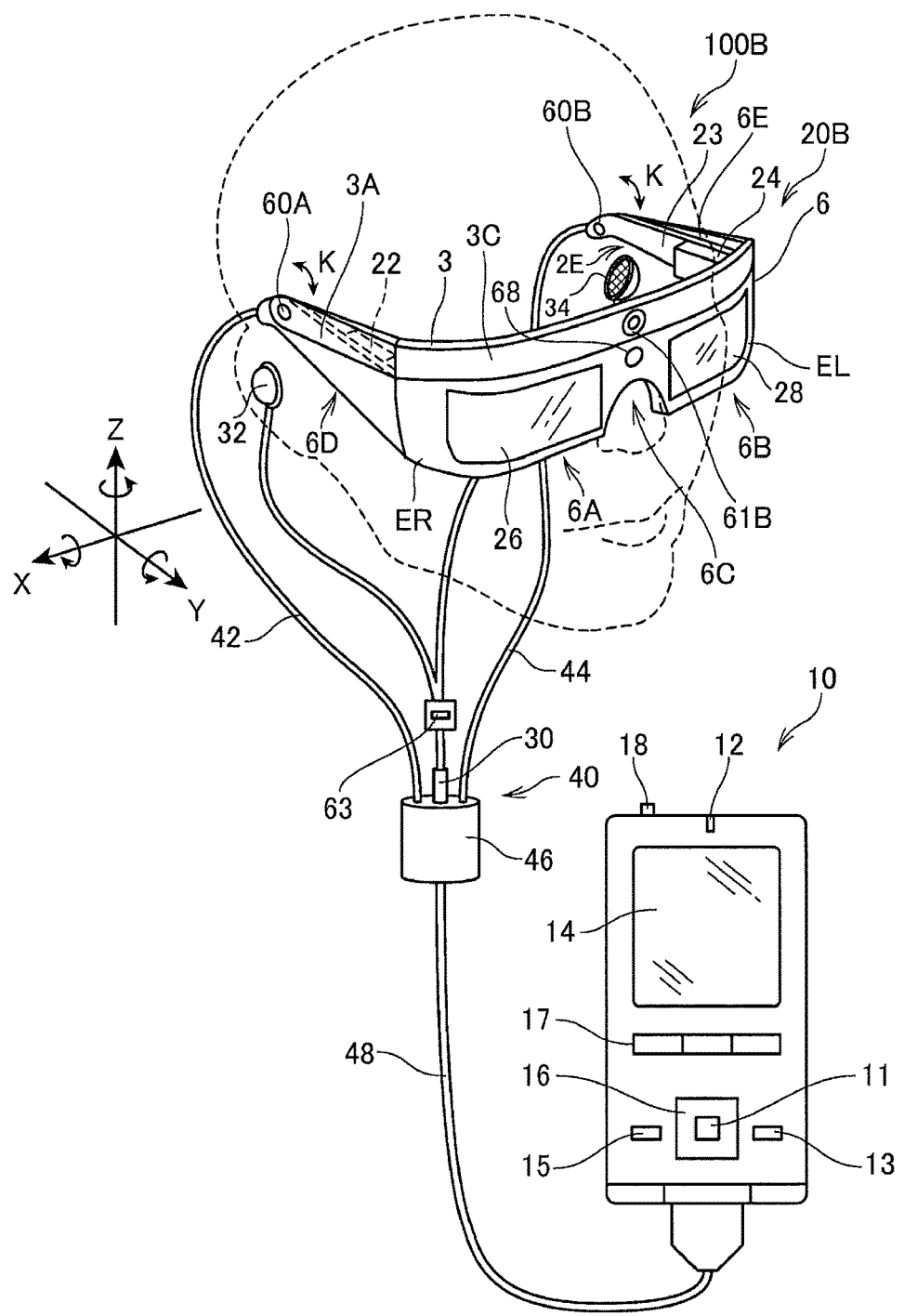
FIG. 5 is a diagram showing the exterior configuration of a head-mounted display device in a second embodiment.

FIG. 5 is a diagram showing the exterior configuration of an HMD 100B according to a second embodiment.

The HMD 100B has a configuration in which an image display section 20B is connected to the control device 10 in the embodiment. Note that, in the image display section 20B, sections configured the same as the sections of the image display section 20 are denoted by the same reference numerals and signs and explanation of the sections is omitted.

Like the image display section 20 (FIG. 1), the image display section 20B is connected to the control device 10 via the connecting section 40. The image display section 20B and the control device 10 transmit various signals via the connecting section 40.

The image display section 20B is a wearing body worn on the head of a user. In this embodiment, the image display section 20B includes a frame 6 (a main body) having an eyeglass shape. The frame 6 includes a right section 6A located in front of the right eye of the user and a left section 6B located in front of the left eye. The right section 6A and the left section 6B are coupled by a bridge section 6C (a coupling section). The bridge section 6C couples the right section 6A and the left section 6B each other in a position corresponding to the middle of the forehead of the user when the user wears the image display section 20B.

The right section 6A and the left section 6B are respectively coupled to temple sections 6D and 6E. The temple sections 6D and 6E support the frame 6 on the head of the user like temples of eyeglasses. The right optical-image display section 26 is disposed in the right section 6A. The left optical-image display section 28 is disposed in the left section 6B. The right optical-image display section 26 and the left optical-image display section 28 are respectively located in front of the right and left eyes of the user when the user wears the image display section 20B.

The temple section 6D is provided to extend from the end portion ER, which is the other end of the right optical-image display section 26, to a position corresponding to the temporal region of the user when the user wears the image display section 20B. Similarly, the temple section 6E is provided to extend from the end portion EL, which is the other end of the left optical-image display section 28, to a position corresponding to the temporal region of the user when the user wears the image display section 20B. The temple section 6D is in contact with the right ear or the vicinity of the right ear in the head of the user. The temple section 6E is in contact with the left ear of the user or the vicinity of the left ear. The temple sections 6D and 6E hold the image display section 20B on the head of the user.

A camera unit 3 is provided in the frame 6. The camera unit 3 includes a camera pedestal section 3C on which an upper camera 61B is disposed and arm sections 3A and 3B that support the camera pedestal section 3C. The arm section 3A is turnably coupled to the temple section 6D by a hinge 60A provided at a distal end portion AP of the temple section 6D. The arm section 3B is turnably coupled to the temple section 6E by a hinge 60B provided at the distal end portion AP of the temple section 6E. Therefore, the camera unit 3 as a whole is turnable in a direction indicated by an arrow K in the figure, that is, turnable up and down in a worn state. The camera unit 3 is in contact with the frame 6 at a lower end of a turning range. An upper end of the turning range of the camera unit 3 is determined by specifications and the like of the hinges 60A and 60B.

The camera pedestal section 3C is a plate-like or bar-like member located across upper parts of the right section 6A, the left section 6B, and the bridge section 6C. The upper camera 61B is embedded and set in a position above the bridge section 6C. The upper camera 61B is a digital camera including an image pickup device such as a CCD or a CMOS and an image pickup lens. The upper camera 61B may be either a monocular camera or a stereo camera.

The upper camera 61B picks up an image of at least a part of an outside scene in a front side direction of the HMD 100B, in other words, in a visual field direction of the user in a state in which the image display section 20B is worn. The breadth of an angle of view of the upper camera 61B can be set as appropriate. However, it is preferable that, at the lower end of the turning range of the camera unit 3, an image pickup range of the upper camera 61B includes an outside world that the user visually recognizes through the right optical-image display section 26 and the left optical-image display section 28. Further, it is more preferable that the image pickup range of the upper camera 61B is set such that an image of the entire visual field of the user through the dimming plates 20A can be picked up. The upper camera 61B executes image pickup according to the control by the control section 110 (FIG. 3) and outputs picked-up image data.

In the image display section 20B, the illuminance sensor 68 is disposed in the bridge section 6C. The illuminance sensor 68 receives light from an outside scene direction visually recognized by the user through the right optical-image display section 26 and the left optical-image display section 28 and outputs a detection value indicating a light amount.

In this way, even in a configuration in which the camera unit 3 mounted with the upper camera 61B is provided displaceably with respect to the frame 6, the illuminance sensor 68 is mounted and the control explained above can be executed by the sub-control section 150 (FIG. 3) that acquires a detection value of the illuminance sensor 68. In this case, effects same as the effects in the first embodiment can be obtained even if the shape of the frame is different.

The upper camera 61B may be further displaceably attached to the camera unit 3.

Third Embodiment

Figure 6:
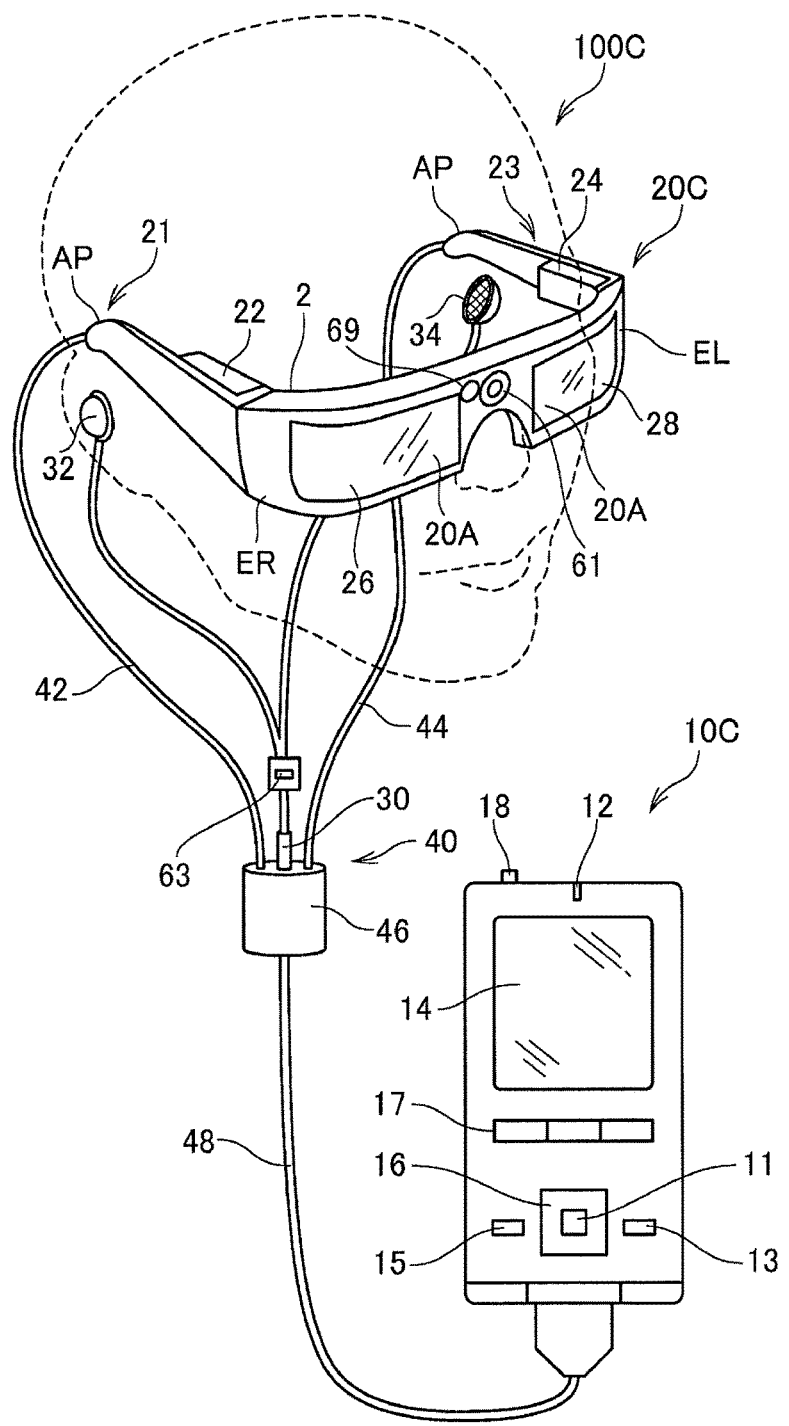
FIG. 6 is an explanatory diagram showing the exterior configuration of a head-mounted display device in a third embodiment.

FIG. 6 is an explanatory diagram showing the exterior configuration of an HMD 100C (a display device) according to a third embodiment applied with the invention.

In the third embodiment, a control device 10C is provided instead of the control device 10 included in the HMD 100 explained in the first embodiment. An image display section 20C (a display section) is provided instead of the image display section 20. In the image display section 20C included in the HMD 100C, an external light sensor 69 is provided instead of the illuminance sensor 68 (FIG. 3) included in the image display section 20. In the control device 10C, as explained below with reference to FIG. 7, a storing section 129 is provided instead of the flash memory 122. Other than these differences, the HMD 100C includes components common to the HMD 100. Therefore, illustration and explanation concerning an optical system are omitted. For example, the configuration of the optical system of the HMD 100C is as shown in FIG. 2. In the HMD 100C, components common to the HMD 100 are denoted by the same reference numerals and signs and explanation of the components is omitted.

The HMD 100C includes the image display section 20C that causes the user to visually recognize a virtual image in a state in which the image display section 20C is worn on the head of the user and a control device 10C that controls the image display section 20C. The control device 10C also functions as a controller with which the user operates the HMD 100C.

In the frame 2 configuring the image display section 20C, the external light sensor 69 (a light detecting section) that detects light is disposed. The external light sensor 69 is an ambient light sensor that receives light and outputs a detection value corresponding to an amount of the received light or the intensity of the received light.

The external light sensor 69 is disposed in the vicinity of the camera 61. The external light sensor 69 receives light irradiated from a direction including an angle of view of the camera 61 toward the external light sensor 69 and detects a light amount. Since the external light sensor 69 is provided adjacent to the image display section 20C, the external light sensor 69 receives light from a direction substantially the same as the direction of light irradiated or made incident on the image display section 20C from the outside. Consequently, the external light sensor 69 receives light from a direction same as the direction of light made incident on the eyes of the user through the image display section 20C. Therefore, the external light sensor 69 can be regarded as receiving external light made incident on the eyes of the user.

As shown in FIG. 6, the external light sensor 69 is provided in a direction in which it is easy to receive light irradiated from the outside of the image display section 20C, in particular, light irradiated from the front of the user.

External light actually made incident on the eyes of the user includes lights transmitted through the right optical-image display section 26, the left optical-image display section 28, and the dimming plates 20A. However, the external light sensor 69 does not have to be configured to receive the light itself transmitted through the right optical-image display section 26 or the left optical-image display section 28. That is, if a detection value of the external light sensor 69 is usable as an index of a light amount or the intensity of the external light made incident on the eyes of the user, the invention can be carried out. For example, as shown in FIG. 6, the external light sensor 69 can receive a part of light irradiated on the outer surface of the image display section 20C from a direction substantially the same as the direction of the external light made incident on the eyes of the user. In this embodiment, as an example, one external light sensor 69 is provided in the frame 2. However, a plurality of external light sensors 69 can also be provided. The position of the external light sensor 69 is the center in the width direction of the frame 2 as shown in FIG. 6. Besides, the external light sensor 69 may be provided at the end portion ER or the end portion EL.

With this configuration, light detected by the external light sensor 69 can be regarded as external light in an outside scene direction visually recognized by the user through the right light guide plate 261 and the left light guide plate 262. In other words, the external light sensor 69 detects the external light OL made incident on the eyes of the user as background light of the image light L shown in FIG. 1

Figure 7:
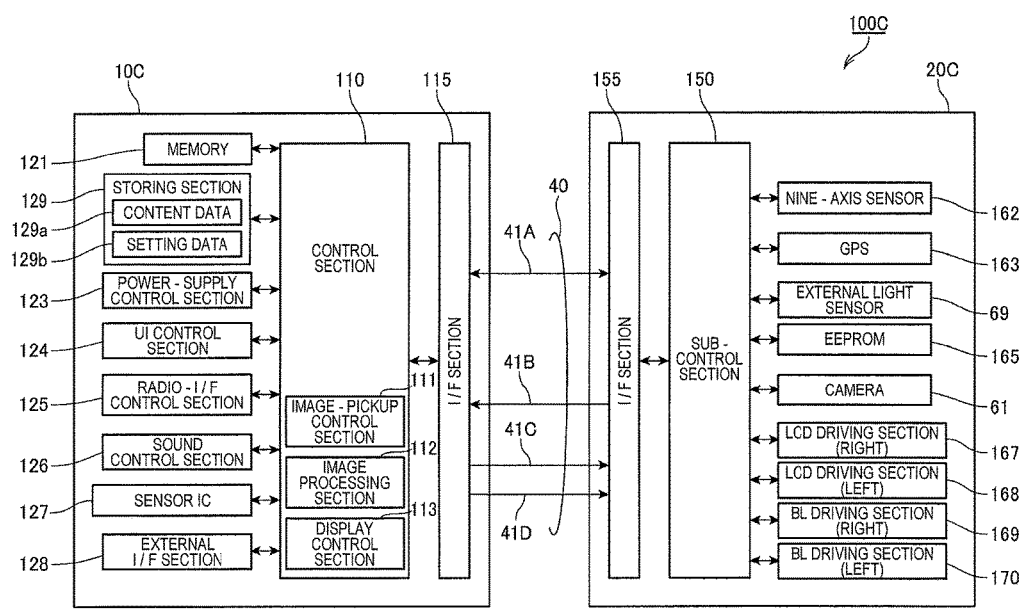
FIG. 7 is a functional block diagram of sections configuring the head-mounted display device in the third embodiment.

FIG. 7 is a functional block diagram of the sections included in the HMD 100C.

The storing section 129 is configured by a semiconductor element like the flash memory 122 and connected to the control section 110 via a data bus. Data stored by the storing section 129 is the same as the data stored in the flash memory 122. For example, the control section 110 receives data of contents from an external apparatus connected by the external I/F section 128 or the radio I/F control section 125 and stores the data in the storing section 129.

The control device 10C includes the external light sensor 69. The external light sensor 69 is connected to the control section 110 via the connecting section 40. The control section 110 receives data indicating a detection value of the external light sensor 69 like data indicating detection values of the other sensors and stores the received data in the memory 121. The data received by the control section 110 includes time stamp information added by the sub-control section 150. The control section 110 adds the time stamp information to the detection value of the sensor IC 127 in a form distinguishable from the time stamp information added by the sub-control section 150 and stores the time stamp information in the memory 121. In the memory 121, the detection value of the sensor is stored in a data format in which the time stamp information is added as one of attributes of the data. The control section 110 may store the data of the detection value of the sensor in the storing section 129.

The external light sensor 69 is connected to the sub-control section 150. As explained above, the external light sensor 69 is an IC of an ambient light sensor (ALS) or an IC obtained by unitizing a plurality of sensors including the ambient light sensor and peripheral circuits of the sensors.

The external light sensor 69 is a color sensor that receives light and detects light amounts or intensities in a plurality of different wavelength regions (frequency bands). In this embodiment, an RGB color sensor is adopted as the external light sensor 69. A frequency sensitivity characteristic of the external light sensor 69 includes peak frequencies respectively corresponding to three colors of R (red), G (green), and B (blue). For example, the external light sensor 69 detects received light intensities in a wavelength region of 570 to 700 nm corresponding to R, a wavelength region of 450 to 630 nm corresponding to G, and a wavelength region of 400 to 540 nm corresponding to B. It is preferable that the external light sensor 69 has, for example, a characteristic matching luminous efficiency of a human. The external light sensor 69 may be a sensor module obtained by modularizing a sensor (detecting section) main body and a circuit section (a detection circuit section) that outputs a detection value of the sensor as digital data.

The external light sensor 69 is driven by the control by the sub-control section 150. The external light sensor 69 outputs, for example, detection values indicating received light amounts or received light intensities in the respective frequency bands of R, G, and B to the sub-control section 150 as digital data.

Sampling frequencies of a plurality of sensors including the external light sensor 69, the nine-axis sensor 162, and the GPS 163 included in the image display section 20C are sometimes greatly different from one another. For example, it is conceivable that a sampling cycle (a sampling frequency) of the acceleration sensor of the nine-axis sensor 162 is 200 times/second or more. On the other hand, it is conceivable that a sampling cycle of the external light sensor 69 may be lower and a sampling cycle of 1 to 10 times/second (a 1000 to 100 ms cycle) is sufficiently useful. The sub-control section 150 sets sampling frequencies of these sensors. The sub-control section 150 acquires detection values of the sensors according to the set sampling frequencies. The sub-control section 150 transmits data of the detection values sampled from the sensors to the control section 110 in a time division manner through the control data bus 41A.

Therefore, the control data bus 41A is not occupied for a long time in order to control a sensor having a low sampling cycle (in other words, having a low sampling frequency or a long sampling interval). Consequently, it is possible to reduce an overhead of the control data bus 41A and efficiently transmit detection values of a large number of sensors through the control data bus 41A. The sub-control section 150 incorporates a RAM (not shown in the figure) and, when a detection value of a sensor is acquired, temporarily stores the detection value in the RAM. The sub-control section 150 adjusts transmission timing of data stored in the RAM and delivers the data to the control data bus 41A. Therefore, the operation of the sub-control section 150 is less easily affected by limitation of the sampling cycles of the sensors. It is possible to prevent a situation in which the processing by the sub-control section 150 is occupied for the control of the sensors.

The control section 110 transmits and receives data via buses of the connecting section 40 to thereby execute AR display with the image display section 20C. The AR display is operation for displaying an image having a so-called AR (Augmented Reality) effect (hereinafter referred to as AR image) according to a target object in a real space visually recognized by the user through the image display section 20C (the right optical-image display section 26 and the left optical-image display section 28). When the AR display is performed, for the user, in a state in which the user is viewing the target object present in the real space, the AR image is seen in a position overlapping the target object or a position corresponding to the target object. Therefore, for the user, a virtual display object including characters or an image is added to the target object in the real space and can be visually recognized. Therefore, this produces an effect as if reality is augmented.

Figure 8A:
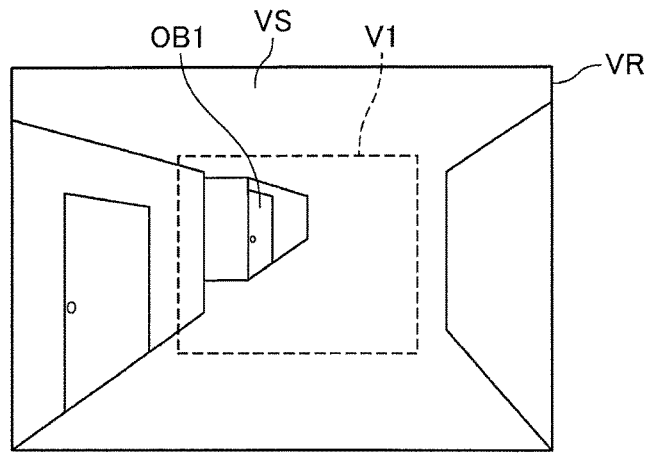
Figure 8B:
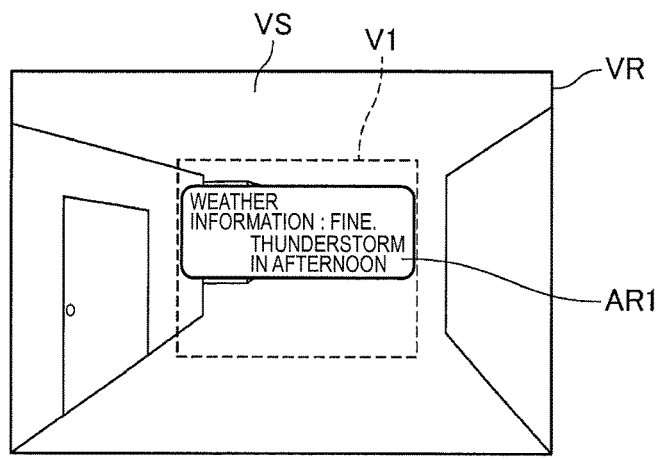
Figure 8C:
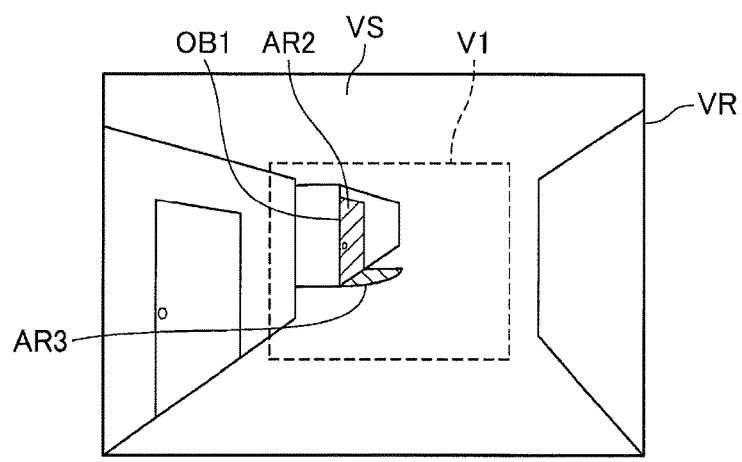

FIGS. 8A to 8C are diagrams showing display states of the HMD 100C. FIG. 8A is an explanatory diagram showing the position of a display region. FIG. 8B shows a first display example. FIG. 8C shows a second display example. In FIGS. 8A to 8C, VR indicates a visual field of the user and VS indicates an outside scene that the user can see in the visual field VR.

V1 indicates a region where the HMD 100C can display an image and cause the user to visually recognize the image, that is, a display region of the image display section 20C. As shown in FIG. 8A, the display region V1 is located substantially in the center of the visual field VR of the user and is narrower than the visual field VR. The display region V1 may have size same as the size of the visual field VR. The size and the position of the display region V1 is not limited to an example shown in FIG. 8A.

The display region V1 is formed when the half mirror 261A (FIG. 2) of the right light guide plate 261 and the half mirror 262A of the left light guide plate 262 reflect image light to the eyes of the user. The display region V1 corresponds to the right LCD 241 and the left LCD 242. For example, when an image is displayed in entire displayable regions of the right LCD 241 and the left LCD 242, it is possible to cause the user to visually recognize an image having the size of the entire display region V1.

The HMD 100C displays, in the display region V1, a display object such as an image or a text that forms the AR image. A display position and a display size of the display object are determined according to the position of a target object in a real space (an outside scene) visually recognized by the user. For example, the control section 110 analyzes a picked-up image of the camera 61 as explained below and performs processing for determining the display position and the size of the display object on the basis of data defining relative positions of an angle of view (an image pickup range) of the camera 61 and the display region V1. As explained above, the angle of view (the image pickup range) of the camera 61 overlaps the visual field VR of the user and, more preferably, the angle of view of the camera 61 includes the entire visual field VR. Therefore, an object in the real space visually recognized by the user in the visual field VR is projected in the picked-up image of the camera 61. It is possible to detect a target object from the picked-up image of the camera 61.

The target object may be a movable object or may be an immovable object, that is, a part or the entire fixed building. A part of the surface of an object may be the target object.

In the example shown in FIG. 8A, a target object OB1, which is a door present in the real space, is included in the visual field VR of the user. In this case, the user visually recognizes the target object OB1 through the image display section 20C. The HMD 100C detects the position of the target object OB1 for which the AR display is performed from the picked-up image of the camera 61. The detected position is a relative position of the target object OB1 to the camera 61. The HMD 100C stores in advance, in the storing section 129, data indicating a relative positional relation between positions in the picked-up image of the camera 61 and the display region V1. The data can be included in, for example, setting data 129b. In this case, the HMD 100C calculates, using the setting data 129b, the position of the target object OB1 in the display region V1 from the position of the target object OB1 in the picked-up image.

In FIG. 8B, an example is shown in which an image AR1 is displayed with visibility higher than the visibility of the target object OB1, that is, conspicuously. When the display in the example shown in FIG. 8B is performed, the HMD 100C determines a display position of the image AR1 to overlap the position where the target object OB1 is visually recognized and sets a display size of the image AR1 as a largest size in the display region V1. It is preferable that the image AR1 shown in FIG. 8B is displayed more conspicuously than the outside scene VS. For example, display luminance in the display region V1 is set to high luminance. The image AR1 is displayed in a color having high visibility.

In FIG. 8C, an example of the AR display for supplementing the external scene VS is shown. Images AR2 and AR3 shown in FIG. 8C are images having an effect of causing the user to visually recognize the target object OB1 of the outside scene VS in a color and a texture different from a color of the outside scene VS. The image AR2 is displayed to overlap the target object OB1 according to the shape of the target object OB1. The image AR3 is displayed in a position in contact with the image AR2 in size adjusted to the image AR2. In the example shown in FIG. 8C, it is preferable that the image AR2 and the image AR3 are displayed to match the outside scene VS. That is, it is preferable that the images AR2 and AR3 do not spoil the visibility of the target object OB1 and the outside scene VS around the target object OB1. Therefore, for example, the display luminance of the images AR2 and AR3 in the display region V1 is set to a degree for not spoiling the visibility of the outside scene VS.

Data for displaying the images AR1 to AR3, which are display objects, shown in FIGS. 8B and 8C is stored in the storing section 129 as content data 129a. The content data 129a may include raster image data of a plurality of display objects or may include vector image data for generating a display object. Alternatively, the content data 129a may include parameters, functions, text data, and the like for generating a display object. The display object is not limited to an image and may include characters. The display object may be a still image or may be a moving image.

Data for displaying a plurality of display objects may be included in the content data 129a. The content data 129a may include sound data. When a display object is displayed, sound may be output by the sound control section 126 on the basis of sound data of the content data 129a.

The visibility of a display object displayed by the HMD 100C in the AR display and the visibility of the outside scene VS visually recognized by the user through the image display section 20C are affected by light made incident on the eyes of the user through the image display section 20C from an outside environment, that is, external light. When a light amount of the external light is large (intensity of the eternal light is high), the visibility of the outside scene VS is improved compared with when the light amount is small (the intensity is low). However, the visibility of the display object is deteriorated. The visibility of the display object is sometimes affected by a color of the external light. The color of the external light can also be considered a balance of wavelength components included in the external light. When external light having high light intensity in a wavelength region in a part of a visible region is made incident on the eyes of the user, the visibility of a wavelength region having high light intensity in the display object is deteriorated compared with when the external light is white light. Therefore, it is likely that a phenomenon occurs in which, for example, the appearance of a color of the display object changes according to the color of the external light and the visibility of a portion of the display object is deteriorated.

The HMD 100C has an adjusting function for changing, according to a color of external light detected by the external light sensor 69, a display form of a display object displayed in the display region V1 and satisfactorily keeping the visibility of the display object. The external light sensor 69 is configured by a color sensor. Therefore, for example, the intensity of the external light can be detected as the intensity in each wavelength region. As a detection result, a frequency spectrum of the external light may be calculated from a detection value of the external light sensor 69. A chromaticity coordinate of the color of the external light may be calculated from the detection value of the external light sensor 69 and set as a detection result. The detection results concerning the color of the external light are collectively referred to as color tone. The HMD 100C calculates a color tone of the external light including any one of the above from the detection value of the external light sensor 69. The HMD 100C adjusts a display color and display luminance of the display object.

The control section 110 (FIG. 7) that controls the HMD 100C includes an image-pickup control section 111, an image processing section 112, and a display control section 113 as functional sections that execute the AR display and the adjusting function.

The image-pickup control section 111 causes the camera 61 to execute image pickup by transmitting a command to the sub-control section 150 via the I/F sections 115 and 155. The sub-control section 150 receives an image pickup command transmitted by the image-pickup control section 111, causes the camera 61 to execute image pickup, and transmits picked-up image data of the camera 61 to the image-pickup control section 111.

The display control section 113 causes the image display section 20C to display the display object on the basis of the content data 129a stored in the storing section 129. The display control section 113 transmits data of the display object generated on the basis of the content data 129a or the content data 129a via the I/F sections 115 and 155. The display control section 113 transmits data indicating a display position and size of the display object, a command for instructing display of the display object, and the like. The sub-control section 150 receives a command and data transmitted by the control section 110, drives the LCD driving sections 167 and 168 and the backlight driving sections 169 and 170, and executes display on the basis of the received data.

When performing display on the basis of the content data 129a, the display control section 113 performs processing for extracting image data of the display object from the content data 129a and processing for generating image data of the display object on the basis of the content data 129a.

The display control section 113 performs processing for calculating a display position of the display object in the display region V1, that is, display positions in the LCD driving sections 167 and 168. When performing normal display without performing the AR display, the display control section 113 calculates a display position of the display object on the basis of the data included in the content data 129a or the setting data 129b set beforehand and transmits a command for designating the display position.

When performing the AR display, for example, when attribute data indicating that the AR display is performed is included in the content data 129a, the display control section 113 performs processing for determining a display position of the display object according to a position where the user visually recognizes the target object OB1 of the AR display. In this processing, the display control section 113 detects an image of the target object OB1 from a picked-up image. In the HMD 100C, concerning an image of the target object OB to be detected, data concerning feature values such as a shape and a color is stored in the storing section 129 as, for example, the setting data 129b. The display control section 113 detects an image of the target object OB1 from the picked-up image and specifies the position of the target object OB1 in the picked-up image using the setting data 129b stored in the storing section 129. Further, the display control section 113 specifies display positions of the display object in the LCD driving sections 167 and 168 and causes the LCD driving sections 167 and 168 to display the display object.

The display control section 113 performs, on the basis of the detection value of the external light sensor 69, processing for adjusting a color tone and/or the luminance of the display object displayed on the image display section 20C. The display control section 113 acquires received light intensity for each wavelength region of the external light and causes, on the basis of the acquired received light intensity, the image processing section 112 to process image data of the display object transmitted to the image display section 20C.

The image processing section 112 executes, on the basis of the image data extracted from the content data 129a by the display control section 113 or the content data 129a, on the image data generated by the display control section 113, processing for changing the color tone or processing for adjusting the luminance. For example, the image processing section 112 corrects, according to correction parameters designated by the image control section 113, gradation values of RGB of pixels included in the processing target image data.

When the AR display is performed, the display control section 113 may switch a display form for displaying the display object to overlap in front of the target object OB1 and a display form for displaying the display object to be visually recognized as overlapping the back of the target object OB1. The display control section 113 may display, by causing the image processing section 112 to display the image data, the display object in a display form in which the display object is visually recognized as being shaded.

Figures 9A, 9B:
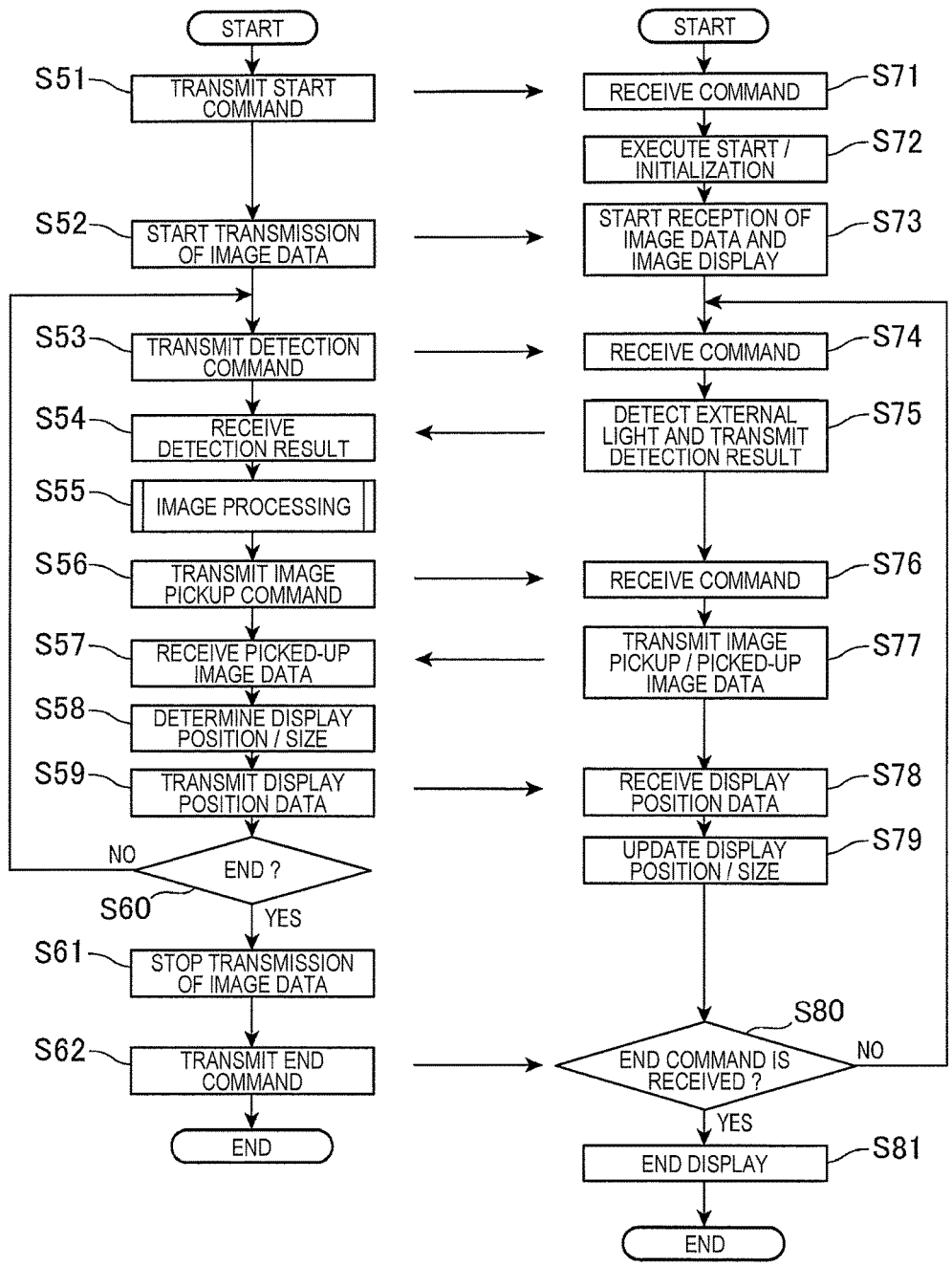

FIGS. 9A and 9B are flowcharts for explaining the operation of the HMD 100C. FIG. 9A shows the operation of the control device 10C. FIG. 9B shows the operation of the image display section 20C.

When the start of a display operation is instructed by operation on the control device 10C, the control section 110 generates a start command and transmits the start command to the sub-control section 150 (step S51). The command is transmitted via the control data bus 41A. The sub-control section 150 receives the command (step S71).

The sub-control section 150 starts operation and performs initialization of the sub-control section 150 and performs initialization of the sections of the image display section 20C including the camera 61, the external light sensor 69, the nine-axis sensor 162, and the GPS 163 according to the command (step S72).

The control section 110 acquires image data of a display object forming an AR image on the basis of the content data 129a and transmits the image data to the sub-control section 150 (step S52). The sub-control section 150 receives the image data and starts display of an image based on the received image data (step S73). The sub-control section 150 causes the backlight driving sections 169 and 170 to operate and lights the right backlight 221 and the left backlight 222. The sub-control section 150 causes the LCD driving section 167 and 168 to operate on the basis of the received image data and displays an image.

Subsequently, the control section 110 generates a detection command for instructing detection execution by the external light sensor 69 and transmits the detection command to the sub-control section 150 (step S53).

The sub-control section 150 receives the detection command (step S74), causes the external light sensor 69 to operate to acquire a detection value, and transmits data indicating a detection result, that is, the detection value to the control section 110 (step S75).

The control section 110 receives the detection result of the external light sensor 69 (step S54) and executes image processing (step S55). The image processing is processing for adjusting the visibility of the display object on the basis of the detection result of the external light sensor 69. Details of the image processing are explained below.

The control section 110 generates an image pickup command for instructing image pickup execution by the camera 61 and transmits the image pickup command to the sub-control section 150 (step S16). The sub-control section 150 receives and executes the image pickup command (step S76), causes the camera 61 to execute image pickup, and transmits picked-up image data to the control section 110 (step S77).

The control section 110 receives the picked-up image data (step S57) and determines on the basis of the picked-up image data a display position and a display size of the display object forming the AR image (step S58). In step S58, the control section 110 detects the target object OB1, which is the target of the AR display, from the picked-up image as explained above and determines the display position and the size of the display object on the basis of the position and the size of the target object OB1 in the picked up image. The control section 110 transmits display position data that designates the display position and the display size of the display object to the sub-control section 150 (step S59).

The sub-control section 150 receives the display position data (step S78) and updates the display positions and the display sizes of the display object in the right LCD 241 and the left LCD 242 (step S79).

The control section 110 determines whether to end the display (step S60). If not to end the display (NO in step S60), the control section 110 returns to step S53. When the end of the display is instructed by the operation of the control device 10C, the control section 110 determines to end the display (YES in step S60) and stops the transmission of the image data (step S61). The control section 110 generates an end command for instructing the display end and transmits the end command to the sub-control section 150 (step S62).

The sub-control section 150 determines whether the end command is received (step S80). If the end command is received (YES in step S80), the sub-control section 150 stops the LCD driving sections 167 and 168 and the backlight driving sections 169 and 170 and ends the display (step S81). If the end command is not received (NO in step S80), the sub-control section 150 returns to step S74.

Figure 10:
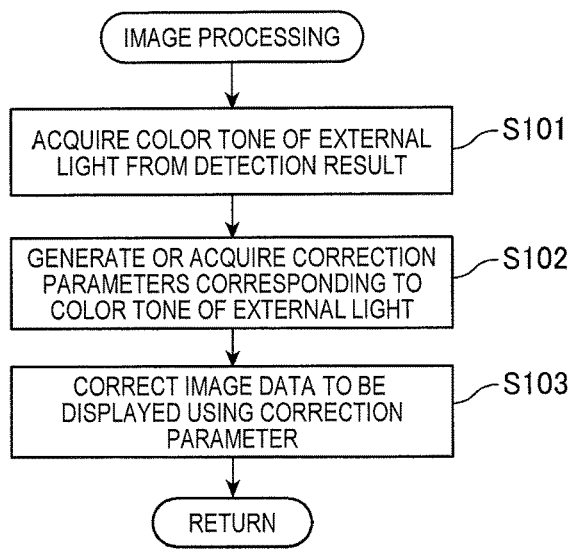
FIG. 10 is a flowchart for explaining an example of image processing executed by the head-mounted display device.

FIG. 10 is a flowchart for explaining, in detail, the image processing executed by the control section 110 in step S55 of FIG. 9A.

The control section 110 acquires a color tone of the external light from the detection result of the external light sensor 69 received in step S54 (FIG. 9A) (step S101). The color tone of the external light is detection values of the received light intensity for each wavelength, the intensities in the wavelength regions of R, G, and B, the received light intensity in the specific wavelength set in advance, and the like explained above, a frequency spectrum or a chromaticity coordinate of the external light calculated from the detection values, and the like. The "color tone" explained in this embodiment may be referred to as "color tone information" including at least one of the various kinds of information concerning the color tone of the external light.

The control section 110 generates or acquires correction parameters corresponding to the color tone of the external light (step S102). In step S102, the control section 110 may perform arithmetic processing on the basis of the color tone of the external light acquired in step S101 and generate the correction parameters. The control section 110 may store, in advance, in the storing section 129, a table (not shown in the figure) that associates the color tone of the external light and the correction parameters and acquire the correction parameters using the table. The table in this case may be included in the setting data 129b.

The control section 110 performs, using the correction parameters generated or acquired in step S102, processing for correcting the image data of the display object (step S103).

Specific examples of the processing shown in FIG. 10 include three kinds of processing explained below.

First processing is processing for maintaining the visibility of the display object not to be deteriorated. In other words, the first processing is processing for preventing deterioration in the visibility when it is likely that the visibility of the display object is deteriorated because of the influence of the external light.

When it is likely that a color tone of the display object is visually recognized as changing because of the influence of the color tone of the external light, the control section 110 corrects gradation values of the image data of the display object to offset the influence of the external light. The right LCD 214 and the left LCD 242 are configured by, for example, liquid crystal display panels that perform display of three colors of R, G, and B and are configured to have color tone characteristics adjusted to white light emitted by the right backlight 221 and the left backlight 222. Therefore, when the external light is so-called white light, the display object is visually recognized in its original color. When the color tone of the external light is a color tone different from the white light, the image light foiming the display object and the external light are made incident on the eyes of the user while overlapping, whereby the display object is seen in a color tone different from the original color tone. In this case, the control section 110 corrects the respective data of the colors of R, G, and B forming the image data such that the display object is visually recognized the same as when the external light is the white light. For example, the control section 110 performs gamma correction of the colors of the image data.

Second processing is processing for further improving the visibility of the display object.

The control section 110 corrects the image data of the display object such that contrast with the color tone of the external light increases. As a result of the second processing, the display object may be visually recognized in a color tone different from the color tone at the time when the external light is the white light.

The first processing and the second processing are useful for a display object desired to be visually recognized by the user conspicuously with respect to the outside view VS like, for example, the image AR1 shown in FIG. 8B.

Third processing is processing for changing the color tone of the display object according to the color tone of the external light. When the third processing is performed, the control section 110 corrects the gradation values of the image data such that the color tone of the display object is close to the color tone of the external light.

According to the third processing, it is possible to obtain a visual effect that the display object fades into the outside scene VS. The third processing is useful for a display object that provides a visual effect by being visually recognized simultaneously with the real space (the target object) like, for example, the images AR2 and AR3 shown in FIG. 8C.

Figure 11:
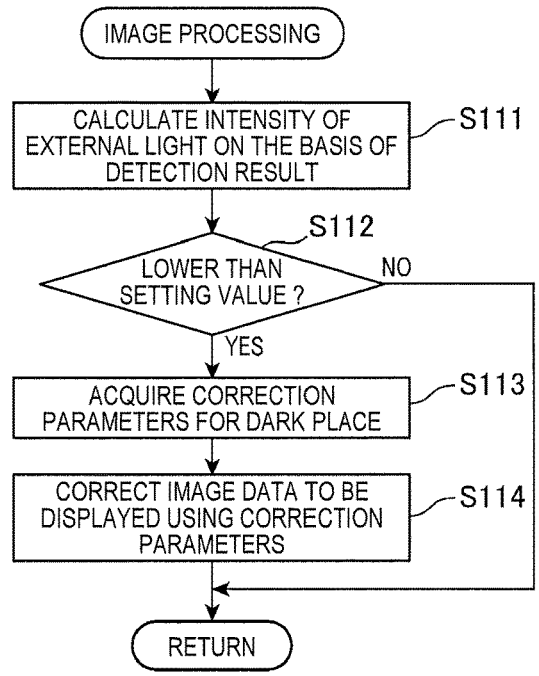
FIG. 11 is a flowchart for explaining another example of the image processing.

FIG. 11 is a flowchart for explaining, in detail, another example of the image processing executed by the control section 110 in step S55 of FIG. 9A.

In the image processing shown in FIG. 11, the control section 110 corrects the image data according to the brightness of the external light, that is, received light intensity of the light received by the external light sensor 69.

The control section 110 calculates the intensity of the external light from the detection result of the external light sensor 69 received in step S54 (FIG. 9A) (step S111). For example, the intensity of the external light may be received light intensity of the external light sensor 69 at a specific wavelength or may be a value calculated from received light intensities at a plurality of wavelengths or in a plurality of wavelength regions set in advance.

The control section 110 determines whether the intensity of the external light is lower than a setting value set in advance (step S112). If the intensity of the external light is lower than the setting value (YES in step S112), the control section 110 generates or acquires correction parameters for a dark place from the setting data 129b (step S113) and corrects the image data of the display object using the correction parameters (step S114). If the intensity of the external light is the same as or higher than the setting value (NO in step S112), the control section 110 ends this processing without performing the correction of the image data.

It is known that, of a rod cell and a cone cell forming a visual cell of a human, the rod cell dominantly works when the intensity of the external light is low (the external light is dark). A photosensitive characteristic (a light absorption characteristic) of the rod cell has a peak at 500 to 550 nm. A peak wavelength of the photosensitive characteristic is present further on a short wavelength side than the cone cell. Therefore, light on the blue side is visually recognized more intense than white when the external light is dark. In the image processing shown in FIG. 11, the image data of the display object is corrected to intensify blue such that the image light of the display object is felt intense by the rod cell. Consequently, when the intensity of light made incident on the eyes of the user is low, the display object can be satisfactorily visually recognized. In the image processing shown in FIG. 11, an effect is obtained that it is possible to improve the visibility of the display object such that the contrast of the display object and the outside scene VS is not excessively large.

The control section 110 can also execute the image processing shown in FIG. 10 and the image processing shown in FIG. 11 in combination. An example of the image processing is shown in FIG. 12.

Figure 12:
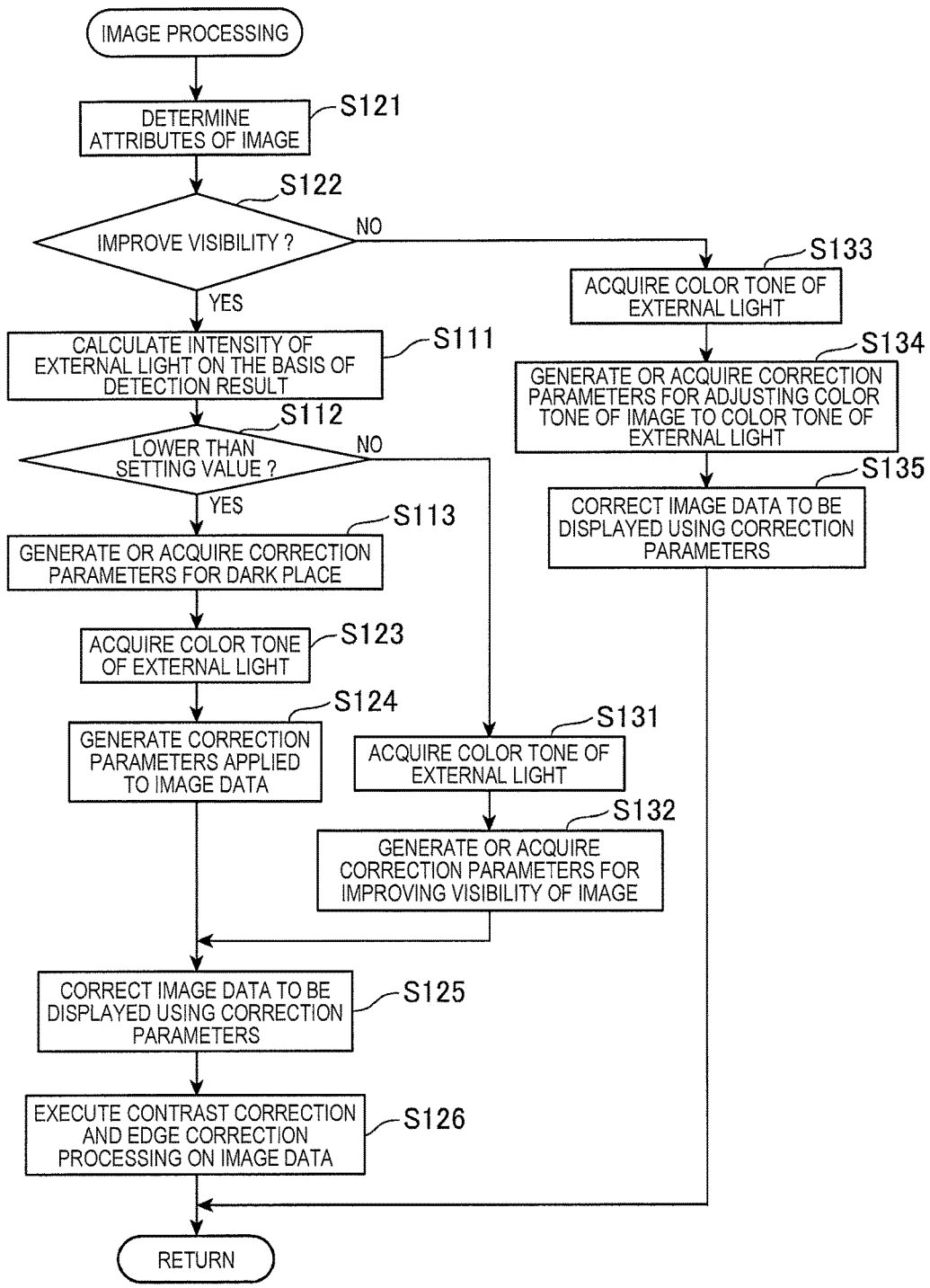
FIG. 12 is a flowchart for explaining another example of the image processing.

FIG. 12 is a flowchart for explaining, in detail, another example of the image processing executed by the control section 110 in step S55 of FIG. 9A. Note that, in FIG. 12, processing steps for performing processing same as the processing shown in FIGS. 10 and 11 are denoted by the same step numbers.

In the image processing shown in FIG. 12, the control section 110 determines attributes of the image data, that is, attributes of the display object (step S121). When the image processing shown in FIG. 12 is performed, data indicating attributes of the display object is added to the image data of the display object included in the content data 129a. The attributes of the display object indicate, for example, whether the display object is made conspicuous with respect to the outside scene VS, that is, whether the visibility of the display object is improved. The image AR1 shown in FIG. 8B and the images AR2 and AR3 shown in FIG. 8C have different attributes.

The control section 110 determines on the basis of the attributes of the display object acquired in step S121 whether processing for improving the visibility of the display object is performed (step S122). If the processing for improving the visibility is performed (YES in step S122), the control section 110 executes the processing in steps S111 and S112 shown in FIG. 11 and determines whether the intensity of the external light is lower than the setting value set in advance (step S112).

If the intensity of the external light is lower than the setting value (YES in step S112), the control section 110 acquires the correction parameters for a dark place from the setting data 129b (step S113).

Further, the control section 110 acquires the color tone of the external light from the detection result of the external light sensor 69 (step S123) and generates correction parameters applied to the image data (step S124). In step S124, the control section 110 generates, according to the color tone of the external light, correction parameters obtained by combining the correction parameters for a dark place acquired in step S113 with the correction parameters for improving the visibility of the display object. Note that the correction parameters generated by the control section 110 in step S124 only have to be parameters with which the visibility in a dark place can be secured as in the image processing shown in FIG. 11 and effects same as the effects of the first or second processing explained with reference to FIG. 10 are obtained. A calculation method and the like are optional.

The control section 110 corrects the image data of the display object using the generated correction parameters (step S125). Further, the control section 110 executes, on the image data after the correction, at least one of contrast correction processing for correcting contrast and edge correction processing (step S126). The contrast correction processing can be, for example, processing for enhancing the contrast and improving the visibility of a dark image. The edge correction processing can be processing for performing edge enhancement to improve the visibility of the dark image. An effect of adapting the display object to the external light may be obtained by reducing the contrast in the contrast correction processing and performing processing for blurring an edge in the edge correction processing.

If the intensity of the external light is the same as or higher than the setting value (NO in step S112), the control section 110 acquires the color tone of the external light from the detection result of the external light sensor 69 (step S131) and generates or acquires correction parameters (step S132). The correction parameters generated in step S132 are correction parameters for maintaining or improving the visibility of the display object with respect to the external light and are parameters with which effects same as the effects of the first or second processing explained with reference to FIG. 10 are obtained. After generating or acquiring the correction parameters, the control section 110 shifts to step S125 and corrects the image data.

On the other hand, if the processing for improving the visibility of the display object is not performed on the basis of the attributes of the image data (NO in step S122), the control section 110 acquires the color tone of the external light from the detection value of the external light sensor 69 (step S133). The control section 110 generates or acquires correction parameters for adjusting the color tone of the image data of the display object to the color tone of the external light (step S134) and corrects the image data with the correction parameters (step S135). The processing in steps S133 to S135 is processing same as the third processing explained with reference to FIG. 10.

When the image processing shown in FIG. 12 is performed, the control section 110 can set the visibility of the display object in a proper state by correcting the image data of the display object according to the brightness of the external light and the attributes of the display object.

When the external light sensor 69 is configured to be capable of switching a range (a detection range) of the intensity of light to be detected in a plurality of stages, in the operations shown in FIGS. 11 and 12, the range of the external light sensor 69 may be switched. Specifically, the control section 110 designates a detection range of the external light sensor 69 according to the detection command (FIG. 9A) transmitted to the sub-control section 150. If the received light intensity indicated by the detection result of the external light sensor 69 is a value smaller than and close to an upper limit of a currently set range, an upper limit value, or a value exceeding the upper limit value, the control section 110 transmits a detection command for switching the range of the external light sensor 69 to a high intensity side. Consequently, even if the intensity of the external light is high, it is possible to appropriately detect the external light. If the received light intensity indicated by the detection result of the external light sensor 69 is a value close to a lower limit of the currently set range, a loser limit value, or a value smaller than the lower limit value, the control section 110 transmits a detection command for switching the range of the external light sensor 69 to a low intensity side. Consequently, even if the intensity of the external light is low, it is possible to appropriately detect the external light. The control section 110 may acquire or generate correction parameters corresponding to the range of the external light sensor 69 and correct the image data. In this case, in step S112 (FIGS. 11 and 12), the control section 110 can determine on the basis of the range set in the external light sensor 69 whether the intensity of the external light is lower than the setting value instead of the processing for determining the intensity from the detection result of the external light sensor 69.

As explained above, the HMD 100C in the third embodiment applied with the invention includes the image display section 20C that outputs the image light including the plurality of color lights to the user and displays the display object. The HMD 100C includes the external light sensor 69 that detects light. The control section 110 controls, on the basis of the detection result of the external light sensor 69, the color tone of the image light output by the image display section 20C. Consequently, it is possible to change the color tone of the image light according to the light detected by the external light sensor 69. Therefore, it is possible to control a color tone of light made incident on the visual field of the user other than the image light and the color tone of the image light to match or control the color tones to improve the visibility of the image light. Consequently, it is possible to appropriately adjust the visibility of the image displayed by the HMD 100C.

The external light sensor 69 detects light from a direction different from the direction of the image light output by the image display section 20C. Therefore, it is possible to control the color tone of the light made incident on the visual field of the user other than the image light and the color tone of the image light to match or control the color tones to improve the visibility of the image light.

The image display section 20C is worn on the head of the user and outputs the image light in a state in which the external light can be made incident on the visual field of the user. The external light sensor 69 detects the external light. Therefore, by changing the color tone of the image displayed by the HMD 100C mounted on the head of the user according to the external light made incident on the visual field of the user, it is possible to adjust the visibility of the image.

The external light sensor 69 is provided adjacent to the image display section 20C. Therefore, it is possible to control a color tone of light detected by the external light sensor 69 in the vicinity of the image display section 20C and the color tone of the image light to match or control the color tones to improve the visibility of the image light.

The control section 110 causes, on the basis of the image data including the plurality of color data, the image display section 20C to output the color lights forming the image and changes the gradation values of the color data included in the image data to thereby change the color tone of the image light. Therefore, it is possible to adjust the visibility of the image through the data processing by changing the gradation values for each color included in the image data.

The external light sensor 69 includes the sensor that detects the intensity of received light for each of the plurality of different wavelengths. Therefore, it is possible to obtain information concerning the color of the light made incident on the visual field of the user.

The control section 110 may control, on the basis of the intensity of the light for each wavelength detected by the external light sensor 69, the color tone of the image light output by the image display section 20C. In this case, by controlling the color tone of the image light according to the color of the light made incident on the visual field of the user, it is possible to appropriately adjust the visibility of the image displayed by the HMD 100C.

The control section 110 controls the color tone of the image light to improve the visibility of the user for visually recognizing the image light. Therefore, it is possible to improve the visibility of the image displayed by the HMD 100C according to the color of the light made incident on the visual field of the user.

The control section 110 controls the luminances of the respective color lights included in the image light to bring the color tone of the image light close to the color tone of the light detected by the external light sensor 69. Consequently, it is possible to adapt the color tone of the image light to the color of the light made incident on the visual field of the user and match the image displayed by the HMD 100C to the color of the external light or the like.

As explained with reference to FIG. 10, the control section 110 can perform the first processing and the second processing for controlling, on the basis of the intensity of the light for each wavelength detected by the external light sensor 69, the luminances of the respective color lights included in the image light to improve the visibility of the user for visually recognizing the image light. The control section 110 can perform, on the basis of the intensity of the light for each wavelength detected by the external light sensor 69, the third processing for controlling the luminances of the respective color lights included in the image light to bring the color tone of the image light close to the color tone of the light detected by the external light sensor 69. As shown in FIG. 12, the control section 110 can select and execute the first and second processing and the third processing according to the attributes of the image displayed on the image display section 20C. Therefore, it is possible to select and execute, according to the attributes of the image displayed by the HMD 100C, the processing for improving the visibility of the image with respect to the external light or the like and the processing for matching the image to the external light or the like.

In step S52 of FIG. 9A, a color correction curve, a γ characteristic, and edge correction processing may be different according to types of processing concerning the visibility of the display object such as a high visibility mode for performing processing for improving the visibility of the display object and a high matching mode for performing processing for adapting and matching the display object to the outside scene and displaying the display object. The color correction curve, the γ characteristic, and the edge correction processing may be different according to a scene in which the HMD 100C is used.

For example, a plurality of operation modes may be provided concerning the visibility of the display object and the outside scene. As an example of the operation modes, there are (1) a "low illuminance environment mode" for improving the visibility of both of the image light and the outside scene in an environment of a dark place with low illuminance (e.g., when the outside is dark and looks only black). For example, there is (2) a "fine-weather document browsing mode" for, in a state in which the illuminance of the external light is equal to or higher than a setting value such as the blazing sun in summer, improving visibility and readability of a display object including a manual such as a work instruction. This operation mode can also be referred to as "high visibility mode" preferential for visibility. For example, there is (3) a "document preferential mode" for improving the visibility of characters and the like in a display object including a document such as a work standard and facilitating work performed looking at the document. This mode can include, for example, an operation for displaying characters of the work standard with a fluorescent color or the like to improve the readability. For example, there is (4) an "additional image fusing mode" or a "color fitting mode" for highly matching the visibility of the display object displayed in the AR display or the like to the outside scene. The HMD 100C may include, for each operation mode, a plurality of lookup tables (LUTs) and an arithmetic expression (a correction curve: a combination of modes by blurring, edge enhancement, and the like) related to display of the display object. The operation modes may include a plurality of operation modes for changing image display luminance adapted to an ambient light color.

When the first or second processing is executed, if the intensity of the light detected by the external light sensor 69 is lower than the intensity set in advance, the control section 110 changes a ratio of the luminances of the respective color lights included in the image light to a ratio set in advance. Specifically, the image data is corrected using the correction parameters for a dark place. Therefore, it is possible to appropriately adjust the visibility of the image even if the intensity of the light such as the external light is low.

If the intensity of the light detected by the external light sensor 69 is lower than the intensity set in advance, the control section 110 changes the ratio of the luminances of the respective color lights included in the image light to the ratio set in advance. Specifically, the control section 110 corrects the image data using the correction parameters for a dark place. Therefore, it is possible to appropriately adjust the visibility of the image even if the intensity of the light such as the external light is low.

The external light sensor 69 may be configured to be capable of switching ranges of received light intensity to be detected. In this case, any one of the ranges is equivalent to the first detection state and another range is equivalent to the detection state more suitable for detection of light with low intensity than the first detection state. The control section 110 can generate or acquire correction parameters for correcting the image data according to the switching or a setting state of the ranges of the external light sensor 69. Therefore, it is possible to highly accurately detect the external light with the external light sensor 69.

As explained with reference to FIG. 12, if the intensity of the light detected by the external light sensor 69 is lower than the intensity set in advance, the control section 110 executes the contrast correction processing and/or the edge correction processing on the image data of the image displayed by the image display section 20C. Therefore, if the intensity of the light such as the external light is low, it is possible to more effectively improve the visibility of the image.

Fourth Embodiment

Figure 13A:
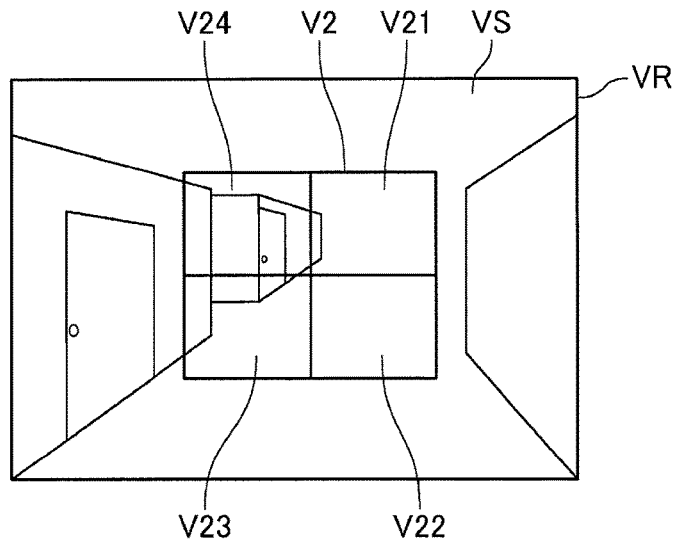
Figure 13B:
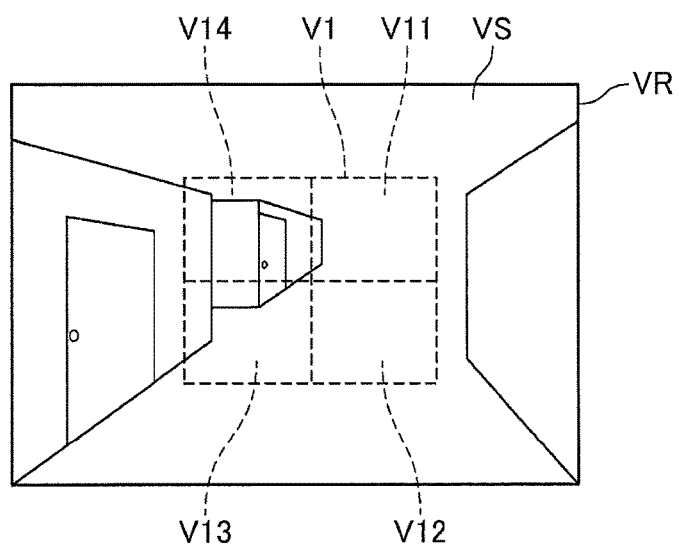

FIGS. 13A and 13B are explanatory diagrams of the operation of the HMD 100C in a fourth embodiment applied with the invention. FIG. 13A shows a region provided in a picked-up image to correspond to a display region. FIG. 13B shows a display region. The HMD 100C in the fourth embodiment is common to the third embodiment except the configuration of the external light sensor 69. Therefore, the components of the HMD 100C are denoted by the same reference numerals and signs and explanation of the components is omitted.

In the external light sensor 69 in the fourth embodiment, a detection range for detecting external light is set. The external light sensor 69 is configured to be capable of detecting a color tone of the external light in the detection range in association with positions in the detection range. This configuration can be realized by, for example, adopting a digital camera capable of performing color image pickup as the external light sensor 69.

In an example shown in FIG. 13A, an external light detection range V2 is set to correspond to the visual field VR of the user. The external light detection range V2 is a range in which the external light sensor 69 detects the external light. The external light detection range V2 is divided into four regions V21, V22, V23, and V24. The external light sensor 69 detects received light intensities of the external light for the respective four regions V21 to V24 and outputs detection values.

The external light detection range V2 is associated with the display region V1. In the fourth embodiment, as shown in FIG. 13B, the control section 110 can divide the display region V1 into four small regions V11, V12, V13, and V14 and correct a color tone of a display object for the respective small regions V11 to V14.

The external light sensor 69 can be disposed in a position apart from the right optical-image display section 26 and the left optical-image display section 28 and configured to not directly detect the external light actually made incident on the display region V1. In this case, the external light detection range V2 of the external light sensor 69 is a position away from a position where the external light sensor 69 actually receives the external light. The control section 110 can indirectly detect the color tone of the external light in the external detection range V2 by converting an actual detection value of the external light sensor 69 into the color tone of the external light in the external light detection range V2. Parameters and an arithmetic expression for associating the display region V1 and the external light detection range V2 can be stored in the storing section 129 and used by the control section 110.

Figure 14:
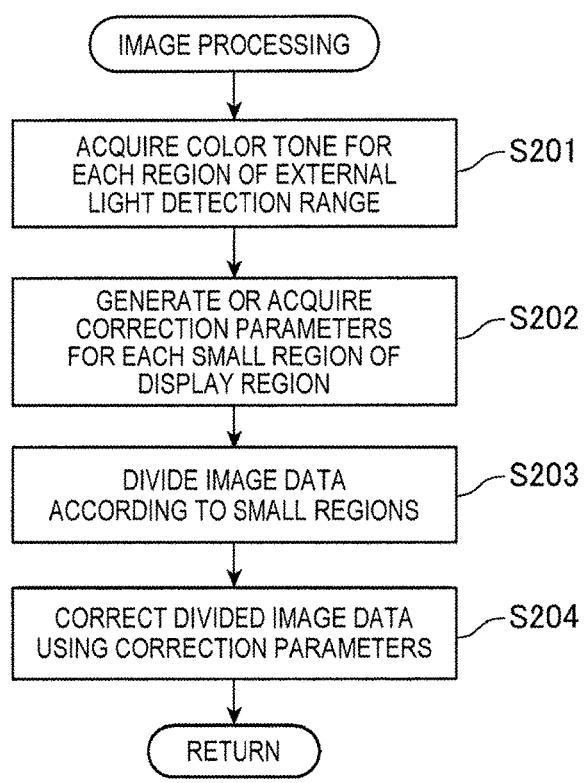
FIG. 14 is a flowchart for explaining an example of image processing in the fourth embodiment.

FIG. 14 is a flowchart for explaining the operation of the HMD 100C in the fourth embodiment. The operation shown in FIG. 14 is executed in step S52 of FIG. 9A and is equivalent to another example of the operation shown in FIGS. 10, 11, and 12.

The control section 110 acquires color tones of the respective regions V21 to V24 in the external light detection range V2 on the basis of the detection value of the external light sensor 69 (step S201). The color tones acquired for the regions V21 to V24 is the same as the color tone acquired in step S101 or the like in the third embodiment. The control section 110 generates or acquires correction parameters for the respective small regions V11 to V14 of the display region V1 on the basis of the color tones acquired in step S201 (step S202).

The control section 110 acquires image data of the display object and divides the image data to correspond to the small regions V11 to V14 (step S203). For the respective divided image data, the control section 110 executes correction using the correction parameters generated or acquired in step S202 (step S204).

In this way, the control section 110 divides the display region V1 into a plurality of small regions V11 to V14 on the basis of a detection result of the external light made incident on the visual field of the user by the external light sensor 69 and controls a color tone of the image light for each of the small regions V11 to V14. According to the fourth embodiment, when the color tone of the external light made incident on the visual field VR is different according to a place in the visual field VR, it is possible to finely correct the color tone of the image light forming the display object according to the external light. Therefore, when there is a difference in the color tone of the external light in the visual field VR, it is possible to effectively adjust the visibility of the display object.

Fifth Embodiment

A fifth embodiment applied with the invention is explained. The HMD 100C in the fifth embodiment is common to the third embodiment. Therefore, components of the HMD 100C are denoted by the same reference numerals and signs and explanation of the components is omitted.

In the fifth embodiment, the control section 110 corrects image data of a display object according to a color tone of the dimming plates 20A. As explained above, since the dimming plates 20A are located on the outer sides of the right optical-image display section 26 and the left optical-image display section 28, external light made incident on the visual field VR is transmitted through the dimming plates 20A. Therefore, a color tone of the external light is affected by a light transmission characteristic (a transmission spectrum in a visible light region) of the dimming plates 20A. The dimming plates 20A can be detachably attachable as explained above. It is conceivable to use the dimming plates 20A in an un-mounted state and replace and mount a plurality of dimming plates 20A having different light transmission characteristics. In the fifth embodiment, an example is explained in which a color tone of the display object is adjusted according to a type of the dimming plates 20A mounted on the image display section 20C.

Figure 15:
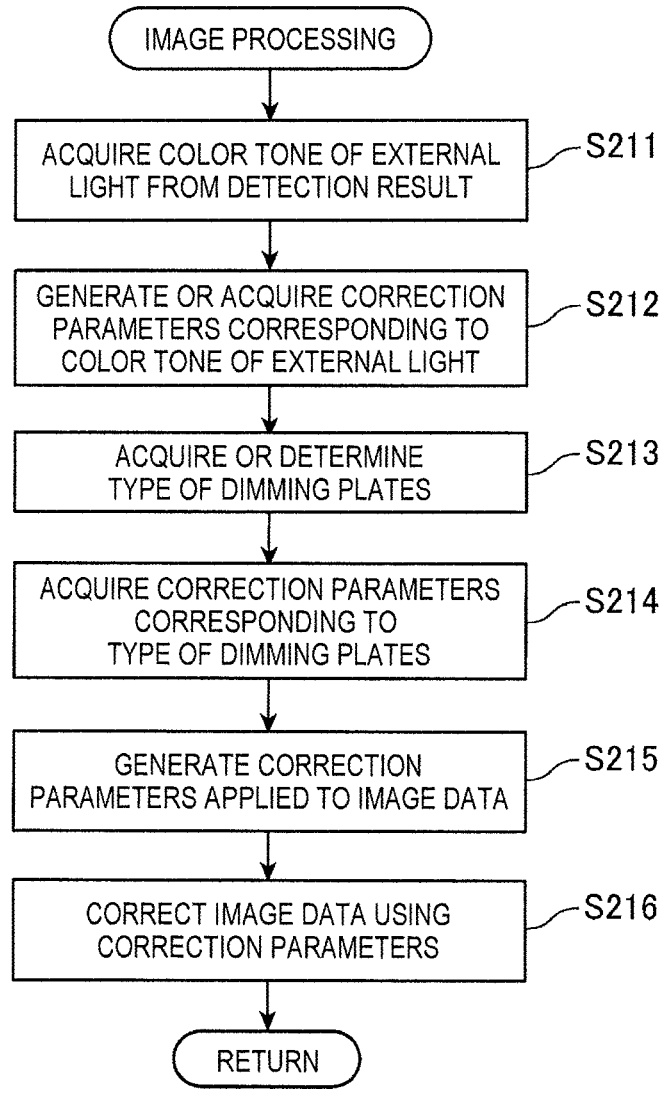
FIG. 15 is a flowchart for explaining an example of image processing in a fifth embodiment.

FIG. 15 is a flowchart for explaining the operation of the HMD 100C in the fifth embodiment. The operation in FIG. 15 is executed in step S52 of FIG. 9A and is equivalent to another example of the operation in FIGS. 10, 11, and 12.

The control section 110 acquires a color tone of external light from the detection result of the external light sensor 69 received in step S54 (FIG. 9A) (step S211). The color tone of the external light is the same as the color tone acquired in step S101 of FIG. 10. The control section 110 generates or acquires correction parameters corresponding to the color tone of the external light (step S212).

The control section 110 acquires or determines a type of the dimming plates 20A mounted on the image display section 20C (step S213). In step S213, if the dimming plates 20A are not mounted, it is determined that the dimming plates 20A are not mounted.

For example, when data indicating a mounting state of the dimming plates 20A, that is, a type of the mounted dimming plates 20A is stored in the storing section 129, the control section 110 acquires the type of the dimming plates 20A on the basis of the data stored in the storing section 129. For example, a user operates the control device 10C to input the data. A detecting mechanism for detecting the type of the dimming plates 20A may be provided in the image display section 20C. For example, it is possible to adopt a configuration in which structures (e.g., protrusions or cutouts) corresponding to the type of the dimming plates 20A are provided in the dimming plates 20A and detecting sections (not shown in the figure) that mechanically come into contact with the structures of the dimming plates 20A are provided in the frame 2. In this case, if contact/noncontact of the structures of the dimming plates 20A is detected in the detecting sections, the control section 110 can determine the type of the dimming plates 20A on the basis of a result of the detection.

The control section 110 acquires correction parameters corresponding to the type of the dimming plates 20A (step S214). In the fifth embodiment, the correction parameters corresponding to the type of the dimming plates 20A are stored in the storing section 129 in advance. The control section 110 generates correction parameters applied to the image data on the basis of the correction parameters acquired in step S214 and the correction parameters generated or acquired in step S212 (step S215). The correction parameters generated by the control section 110 in step S215 are correction parameters obtained by taking into account the fact that the color tone of the external light changes from the color tone of the external light detected by the external light sensor 69 when the external light is transmitted through the dimming plates 20A. Consequently, the control section 110 can perform correction corresponding to the color tone of the external light transmitted through the dimming plates 20A.

The control section 110 performs processing for correcting the image data of the display object using the correction parameters generated in step S215 (step S216).

According to the fifth embodiment, in the configuration in which the external light not transmitted through the dimming plate 20A is detected by the external light sensor 69, if the color tone of the external light changes when the external light is transmitted through the dimming plate 20A, it is possible to correct the color tone of the display object taking into account the change in the color tone. Therefore, it is possible to adjust the visibility of the display object according to the influence of the external light actually made incident on the eyes of the user.

Note that, as a method of obtaining effects same as the effects in the fifth embodiment, it is possible to adopt a configuration in which the external light sensor 69 receives the external light transmitted through the dimming plate 20A. In this case, a light receiving surface or a light receiving section of the external light sensor 69 only has to be disposed in a position covered by the dimming plate 20A.

Sixth Embodiment

Figure 16:
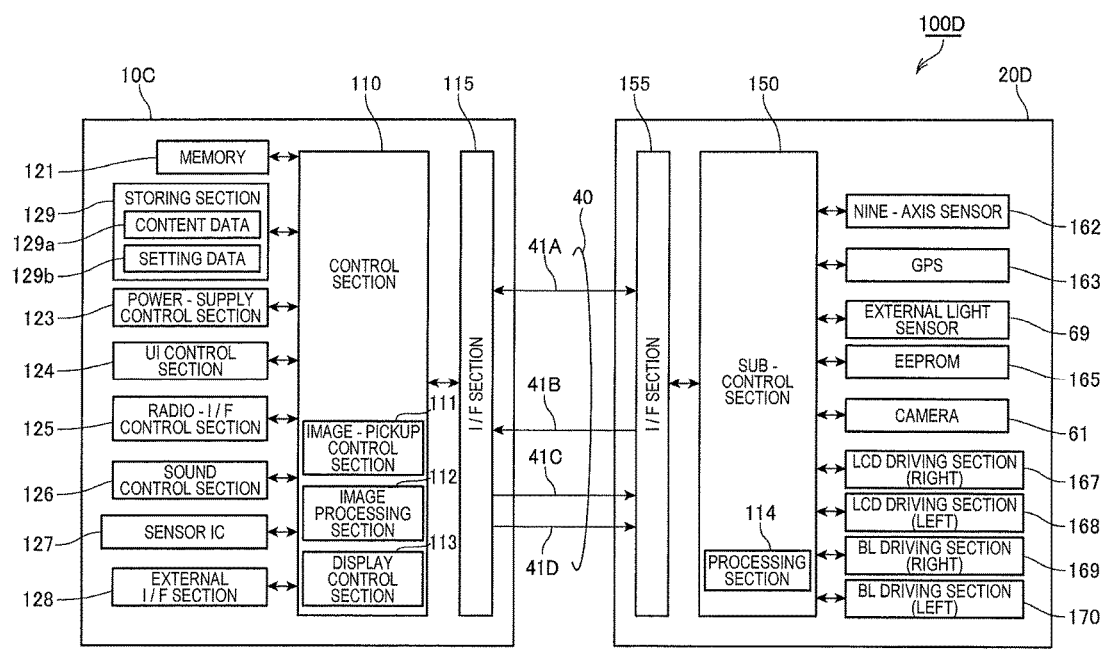
FIG. 16 is a functional block diagram of a head-mounted display device in a sixth embodiment.

FIG. 16 is a block diagram showing the configuration in a sixth embodiment applied with the invention.

In the sixth embodiment, an HMD 100D is explained in which an image display section 20D including a processing section 114 in the sub-control section 150 is provided instead of the image display section 20C included in the HMD 100C explained in the third embodiment. The HMD 100D includes components common to the HMD 100C except the processing section 114. Therefore, illustration and explanation are omitted concerning an exterior configuration and an optical system. In the HMD 100D, components common to the HMD 100C are denoted by the same reference numerals and signs and explanation of the components is omitted.

The sub-control section 150 of the image display section 20D includes the processing section 114 that corrects image data on the basis of a detection result of the external light sensor 69. That is, a CPU (not shown in the figure) configuring the sub-control section 150 executes a computer program stored in the ROM (not shown in the figure) of the sub-control section 150 or the storing section 129 to thereby execute a function of the processing section 114.

In this case, the control section 110 does not execute the operation indicated by steps S53 to S55 of FIG. 9A. The sub-control section 150 causes, without receiving a command from the control section 110, the processing section 114 to execute detection by the external light sensor 69. Further, the sub-control section 150 executes, with the processing section 114, the image processing indicated by step S55 of FIG. 9A. As the image processing, all the kinds of processing explained with reference to FIGS. 10, 11, 12, 14, and 15 can be executed.

According to this configuration, it is possible to obtain effects same as the effects in the third to fifth embodiments. The sub-control section 150 can be configured to execute the functions of the image-pickup control section 111 and the display control section 113 of the control section 110 according to a computer program.

Further, the sub-control section 150 can be configured to execute all or a part of the functions of the control section 110. Not only the control section 110 but also the memory 121, the storing section 129, the power-supply control section 123, the UI control section 124, the radio-I/F control section 125, the sound control section 126, the sensor IC 127, and the external I/F section 128 may be mounted on the image display section 20C. Only the UI control section 124, the sensor IC 127, and the external I/F section 128 may be provided in the control device 10C. The other functional sections may be provided in the image display section 20D. The control device 10C and the image display section 20D may connected by a radio communication line.

Note that the invention is not limited to the configurations of the embodiments. The invention can be carried out in various forms without departing from the spirit of the invention. For example, instead of the image display sections 20, 20B, 20C, and 20D, an image display section of another system such as an image display section worn like a hat may be adopted. The image display section only has to include a display section that displays an image corresponding to the left eye of the user and a display section that displays an image corresponding to the right eye of the user. The display device according to the invention may be configured as, for example, a head mounted display mounted on a vehicle such as an automobile or an airplane. The display device according to the invention may be configured as a head mounted display incorporated in a body protector such as a helmet. In this case, a portion for positioning a position corresponding to the body of the user and a portion positioned with respect to the portion can be a mounting section.

As the control device 10, a notebook computer, a tablet computer, or a desktop computer may be used. Alternatively, as the control device 10, portable electronic apparatuses including a game machine, a cellular phone, a smart phone, and a portable media player, other dedicated apparatuses, or the like may be used.

For example, the configuration for generating image light in the image display sections 20 and 20B may include an organic EL (Electro-Luminescence) display and an organic EL control section. As the configuration for generating image light, an LCOS (Liquid Crystal on Silicon: LCoS is a registered trademark), a digital micro mirror device, or the like can also be used.

As the optical system for guiding image light to the eyes of the user, it is possible to adopt an optical system including an optical member that transmits external light made incident toward the device from the outside and configured to make the light incident on the eyes of the user together with the image light. An optical member located in front of the eyes of the user and overlapping a part or the entire visual field of the user may be used. Further, a scanning-type optical system for scanning a laser beam or the like to form image light may be adopted. The optical system is not limited to an optical system for guiding the image light on the inside of an optical member and may be an optical system having only a function of refracting and/or reflecting the image light toward the eyes of the user.

For example, it is also possible to apply the invention to a head mounted display of a laser retinal projection type. That is, an optical system may be adopted in which a light emitting section includes a laser beam source and an optical system for guiding a laser beam source to the eyes of the user, makes the laser beam incident on the eyes of the user to scan the retina, and forms an image on the retina to thereby cause the user to visually recognize the image.

The invention can also be applied to a display device that adopts a scanning optical system including a MEMS mirror and makes use of a MEMS display technique. That is, the display device may include, as a light emitting section, a signal-light forming section, a scanning optical system including a MEMS mirror that scans light emitted by the signal-light forming section, and an optical member on which a virtual image is formed by the light scanned by the scanning optical system. In this configuration, the light emitted by the signal-light forming section is reflected by the MEMS mirror, made incident on the optical member, and guided in the optical member to reach a virtual-image forming surface. The MEMS mirror scans the light, whereby a virtual image is formed on a virtual image forming surface. The user catches the virtual image with the eyes to recognize an image. An optical component in this case may be an optical component that guides light through a plurality of times of reflection like, for example, the right light guide plate 261 and the left light guide plate 262 in the embodiments. A half mirror surface may be used as the optical component.

At least a part of the functional blocks shown in FIGS. 3, 7, and 16 may be realized by hardware or may be realized by cooperation of the hardware and software. Therefore, the functional blocks are not limited to the configuration in which the independent hardware resources are disposed as shown in FIGS. 3, 7, and 16. The functional sections shown in FIGS. 3, 7, and 16 are not limited to an example of a configuration including a microprocessor and an IC and may be a configuration in which a plurality of functional sections are mounted on a larger integrated circuit or may be a form of an SoC (System-on-a-chip). The components formed in the control device 10 may be redundantly formed in the image display section 20.

The operation of the control section explained in the first to fifth embodiments can also be realized as a computer program. That is, the control section 110 and/or the sub-control section 150 may include a CPU, a ROM, and a RAM. The CPU may execute a computer program to thereby realize the functions of, for example, the image-pickup control section 111, the image processing section 112, the display control section 113, and the processing section 114. The CPU of the control section 110 and/or the sub-control section 150 may execute a computer program to thereby execute functions of an operating system and the like. A part or all of these computer programs may be realized as hardware. For example, the processing sections included in the control section 110 and/or the sub-control sections 150 may be configured using an ASIC (Application Specific Integrated Circuit) or may be configured by programming a PLD (Programmable Logic Device) such as an FPGA (Field-Programmable Gate Array). The processing sections may be realized as a circuit including a plurality of semiconductor devices. When the hardware executes a computer program to realize the functions, the computer program may be stored in the ROM, the flash memory 122, the storing section 129, or another storage device in the control devices 10 and 10C. Alternatively, the control devices 10 and 10C may acquire the computer program stored in an external device via the communication section 117 or the interface 180 and execute the computer program.

The entire disclosure of Japanese Patent Application Nos. 2014-260216, filed Dec. 24, 2014 and 2015-119199, filed Jun. 12, 2015 are expressly incorporated by reference herein.

What is claimed is:

1. A display device comprising:
    a display configured to output image light to a user;
    a sensor configured to detect light; and
    a controller configured to adjust, on the basis of a detection value of the sensor, the image light output by the display, wherein
    the display outputs image light including a plurality of color lights to the user and displays an image,
    the controller controls, on the basis of a detection result of the sensor, a color tone of the image light output by the display,
    the sensor detects intensity of received light for each of a plurality of different wavelengths, and
    the controller is configured to execute first processing for controlling, on the basis of the intensity of the light for each wavelength detected by the sensor, the luminance of each of the plurality of color lights included in the image light to improve visibility of the user for visually recognizing the image light and second processing for controlling, on the basis of the intensity of the light for each wavelength detected by the sensor, the luminance of each of the plurality of color lights included in the image light to bring the color tone of the image light close to a color tone of the light detected by the sensor and selects and executes one of the first processing and the second processing according to an attribute of an image displayed on the display.

2. The display device according to claim 1, wherein
    the display device is a display device of a head mounted type mounted on a head of a user,
    the display irradiates the image light on eyes of the user, and
    the controller performs adjustment processing for adjusting luminance of the display and correction processing for calculating a correction coefficient on the basis of a detection value of the sensor and correcting the luminance of the display.

3. The display device according to claim 2, wherein the controller calculates the correction coefficient using the detection value of the sensor.

4. The display device according to claim 3, wherein the controller calculates the correction coefficient by applying the detection value of the sensor to an arithmetic expression set in advance and performing arithmetic processing.

5. The display device according to claim 3, wherein the controller calculates the correction coefficient by applying the detection value of the sensor to a table set in advance.

6. The display device according to claim 2, wherein the controller performs, in the correction processing, according to the correction coefficient, an arithmetic operation for correcting the luminance of the display after the adjustment processing and corrects the luminance of the display.

7. The display device according to claim 6, wherein the controller multiplies a luminance value of the display set in the adjustment processing with the correction coefficient and corrects the luminance value of the display through the correction processing.

8. The display device according to claim 2, wherein the controller executes hysteresis processing in changing a luminance value of the display to the corrected luminance value through the correction processing and is capable of setting a condition of the hysteresis processing independently when the luminance value of the display is changed to a high luminance side and when the luminance value is changed to a low luminance side.

9. The display device according to claim 2, wherein
    the display includes a display for a right eye configured to irradiate the image light on a right eye of the user and a display for a left eye configured to irradiate the image light on a left eye of the user, and
    the controller sets luminance of the display for the right eye and luminance of the display for the left eye independently from each other through the adjustment processing.

10. The display device according to claim 2, wherein the display is a display of a see-through type that transmits external light and makes the external light incident on the eyes of the user.

11. The display device according to claim 10, wherein the sensor includes a light sensor that detects light from a direction of visual recognition of the user through the display.

12. The display device according to claim 2, further comprising a microprocessor configured separately from the controller and connected to the controller, wherein
    the microprocessor instructs the controller to perform the correction processing, and
    the controller executes the adjustment processing and the correction processing on the basis of the instruction of the microprocessor.

13. The display device according to claim 1, wherein the sensor detects light from a direction different from a direction of the image light output by the display.

14. The display device according to claim 13, wherein
the display is worn on the head of the user and configured to output the image light in a state in which external light can be made incident on a visual field of the user, and sensor detects the external light made incident on the visual field of the user.

15. The display device according to claim 1, wherein
the sensor is provided adjacent to the display and detects light from a front of a face of the user.

16. The display device according to claim 1, wherein the controller causes, on the basis of image data including a plurality of color data, the display to output the color lights forming the image and, by changing a gradation value of the plurality of color data included in the image data, change the color tone of the image light.

17. The display device according to claim 1, wherein the controller controls, on the basis of the intensity of the light for each wavelength detected by the sensor, the color tone of the image light output by the display.

18. The display device according to claim 17, wherein the controller controls the color tone of the image light to improve visibility of the user for visually recognizing the image light.

19. The display device according to claim 17, wherein the controller controls the luminance of each of the plurality of color lights included in the image light to bring the color tone of the image light close to a color tone of the light detected by the sensor.

20. The display device according to claim 1 wherein, when executing the first processing, if the intensity of the light detected by the sensor is lower than intensity set in advance, the controller changes a ratio of the luminance of each of the plurality of color lights included in the image light to a ratio set in advance.

21. The display device according to claim 20, wherein, if the intensity of the light detected by the sensor is lower than the intensity set in advance, the controller executes contrast correction processing and/or edge correction processing on image data of the image displayed by the display.

22. The display device according to claim 1, wherein, if the intensity of the light detected by the sensor is lower than intensity set in advance, the controller changes a ratio of the luminance of each of the plurality of color lights included in the image light to a ratio set in advance.

23. The display device according to claim 22, wherein
the sensor is capable of being switched to a first detection state and a second detection state more suitable for detection of light having low intensity than the first detection state, and when the sensor is switched to the second detection state, the controller changes the ratio of the luminance of each of the plurality of color lights included in the image light to the ratio set in advance.

24. A display device comprising:
a display configured to output image light to a user;
a sensor configured to detect light; and
a controller configured to adjust, on the basis of a detection value of the sensor, the image light output by the display, wherein the display outputs image light including a plurality of color lights to the user and displays an image, the controller controls, on the basis of a detection result of the sensor, a color tone of the image light output by the display, the display includes a display region located in a visual field of the user, and the controller divides the display region into a plurality of portions and controls the color tone of the image light for each of the portions on the basis of a detection result of detection of the external light made incident on the visual field of the user by the sensor.

25. The display device according to claim 24, wherein the sensor is capable of detecting intensities of respective lights made incident on the visual field of the user from a plurality of directions.

26. A control method for a display device including a display configured to output image light to a user and a sensor configured to detect light, the control method comprising:

adjusting, on the basis of a detection value of the sensor, the image light output by the display;

outputting image light including a plurality of color lights to the user and displays an image;

controlling, on the basis of a detection result of the sensor, a color tone of the image light output by the display;

detecting, by the sensor, intensity of received light for each of a plurality of different wavelengths; and executing first processing for controlling, on the basis of the intensity of the light for each wavelength detected by the sensor, the luminance of each of the plurality of color lights included in the image light to improve visibility of the user for visually recognizing the image light and second processing for controlling, on the basis of the intensity of the light for each wavelength detected by the sensor, the luminance of each of the plurality of color lights included in the image light to bring the color tone of the image light close to a color tone of the light detected by the sensor and selects and executes one of the first processing and the second processing according to an attribute of an image displayed on the display.

27. The control method for the display device according to claim 26, further comprising:

controlling a display device including, as the display, a display worn on a head of a user and configured to irradiate image light on eyes of the user; and executing adjustment processing for adjusting luminance of the display and correction processing for calculating a correction coefficient on the basis of a detection value of the sensor and correcting the luminance of the display.

28. The control method for the display device according to claim 26, further comprising:

controlling a display device including, as the display, a display configured to output image light including a plurality of color lights to a user and display an image and including, as the sensor, a sensor configured to detect light made incident on a visual field of the user from a direction different from a direction of the image light output by the display; and controlling, on the basis of a detection result of the sensor, a color tone of the image light output by the display.

* * * * *